(12) United States Patent
Rothman et al.

(10) Patent No.: US 7,398,382 B2
(45) Date of Patent: Jul. 8, 2008

(54) METHOD AND APPARATUS TO ENHANCE PLATFORM BOOT EFFICIENCY

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 11/026,420

(22) Filed: Dec. 29, 2004

(65) Prior Publication Data

US 2006/0143432 A1 Jun. 29, 2006

(51) Int. Cl.
G06F 9/00 (2006.01)
G06F 15/177 (2006.01)
G06F 15/16 (2006.01)

(52) U.S. Cl. .......................... 713/2; 709/217; 709/219; 709/222

(58) Field of Classification Search .................. 709/203, 709/222; 713/2
See application file for complete search history.

(56) References Cited

U.S. PATENT DOCUMENTS

| | | | | | |
|---|---|---|---|---|---|
| 5,280,627 | A | * | 1/1994 | Flaherty et al. | 713/2 |
| 5,452,454 | A | * | 9/1995 | Basu | 713/2 |
| 6,138,162 | A | * | 10/2000 | Pistriotto et al. | 709/229 |
| 6,389,462 | B1 | * | 5/2002 | Cohen et al. | 709/218 |
| 6,549,934 | B1 | * | 4/2003 | Peterson et al. | 709/203 |
| 6,854,009 | B1 | * | 2/2005 | Hughes | 709/220 |
| 6,965,924 | B1 | * | 11/2005 | Gerthe | 709/218 |
| 6,976,058 | B1 | * | 12/2005 | Brown et al. | 709/217 |
| 7,032,031 | B2 | * | 4/2006 | Jungck et al. | 709/246 |
| 7,085,921 | B2 | * | 8/2006 | Frye, Jr. | 713/1 |
| 7,099,927 | B2 | * | 8/2006 | Cudd et al. | 709/217 |
| 7,123,613 | B1 | * | 10/2006 | Chawla et al. | 370/389 |
| 7,188,191 | B1 | * | 3/2007 | Hovell et al. | 709/245 |
| 7,203,735 | B1 | * | 4/2007 | Le Pennec et al. | 709/219 |
| 2003/0126242 | A1 | * | 7/2003 | Chang | 709/222 |
| 2003/0208675 | A1 | * | 11/2003 | Burokas et al. | 713/1 |
| 2004/0068576 | A1 | * | 4/2004 | Lindbo et al. | 709/232 |
| 2005/0144431 | A1 | * | 6/2005 | Lin et al. | 713/1 |
| 2005/0278583 | A1 | * | 12/2005 | Lennert et al. | 714/43 |

OTHER PUBLICATIONS

Preboot Execution Environment (PXE) Specification, Intel Corporation, Sep. 20, 1999, ver. 2.1, pp. 1-101.

* cited by examiner

*Primary Examiner*—Thomas Lee
*Assistant Examiner*—Jaweed A Abbaszadeh
(74) *Attorney, Agent, or Firm*—Blakely, Sokoloff, Taylor & Zafman LLP

(57) ABSTRACT

Methods and apparatus for improving network boot efficiency are disclosed. Under embodiments of the method, boot images that are initially sent from a boot server to various clients are cached at network devices along communication paths between the boot server and the clients. In response to subsequent boot image requests from the clients, boot images cached at the network devices are downloaded directly from the network devices rather than from the boot server, reducing network traffic to and from the boot server and domains in between. In addition, boot program bootstrap files may also be cached and downloaded in a similar manner. Techniques are also disclosed for intercepting boot image download and network bootstrap program requests at the network devices, and for maintaining valid boot image cache configurations across the network. The network devices generally include switches, routers, bridges, and gateway servers.

23 Claims, 17 Drawing Sheets

METHOD AND APPARATUS TO ENHANCE PLATFORM BOOT EFFICIENCY

FIELD OF THE INVENTION

The field of invention relates generally to computer platforms and networks and, more specifically but not exclusively relates to techniques for performing network booting in an efficient manner.

BACKGROUND INFORMATION

A common problem faced by IT (information technology) managers is to ensure that client systems in their enterprises can boot appropriate software images using appropriate configuration parameters. Formerly, this process typically entailed performing an entire operating system installation for each computer, which was often necessary due to the differences in unrestricted platform configurations within an enterprise. This process was improved by controlling the platform configuration (e.g., by purchasing significant numbers of platforms having the same configurations), which enabled an operating system to be provisioned on a platform by simply copying an installation image corresponding to a given platform configuration to each platform in the enterprise having that configuration.

More recently, there is gathering momentum for implementing network booting of operating systems (OS) across all or portions of an enterprise internet. This is driven by several factors, including a reduced expense (both in capital and maintenance costs) for diskless workstations, enterprise software licensing considerations, configuration management workload for the IT department, and security considerations (viruses, hackers, etc.). Under a network boot, a selected boot image is loaded each time a given platform is started or reset. The provisioning of boot images is typically performed in conjunction with client authentication and security considerations. These selected boot images and configuration parameters must be acquired from selected servers in the enterprise as dictated by the needs of the particular environment, the capabilities or mission of the user, the resources available within the client, etc. Furthermore, these clients should boot consistently and in an interoperable manner regardless of the sources or vendors of the software and the hardware of both client and server machines.

While network booting provides several advantages, particularly improved configuration control and reduced software management requirements, it introduces new problems with respect to network traffic and security considerations. For example, a large enterprise internet may serve 1000's of users. With modern boot images approaching upwards of a gigabyte or more, a significant load is placed on the enterprise internet and boot servers, particularly during timeframes in which system booting is heavy, such as during the start of a work day.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for improving network boot efficiency are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now described, techniques are disclosed for performing network booting in a manner that reduces boot-related network traffic while meeting the aforementioned configuration and security criteria required by IT managers and the like. By way of example, various embodiments are described in connection with an exemplary enterprise network that is illustrative of various components common to typical enterprise networks. The techniques may also be employed for other network architectures using the general principles and teachings disclosed herein.

Figure 1:
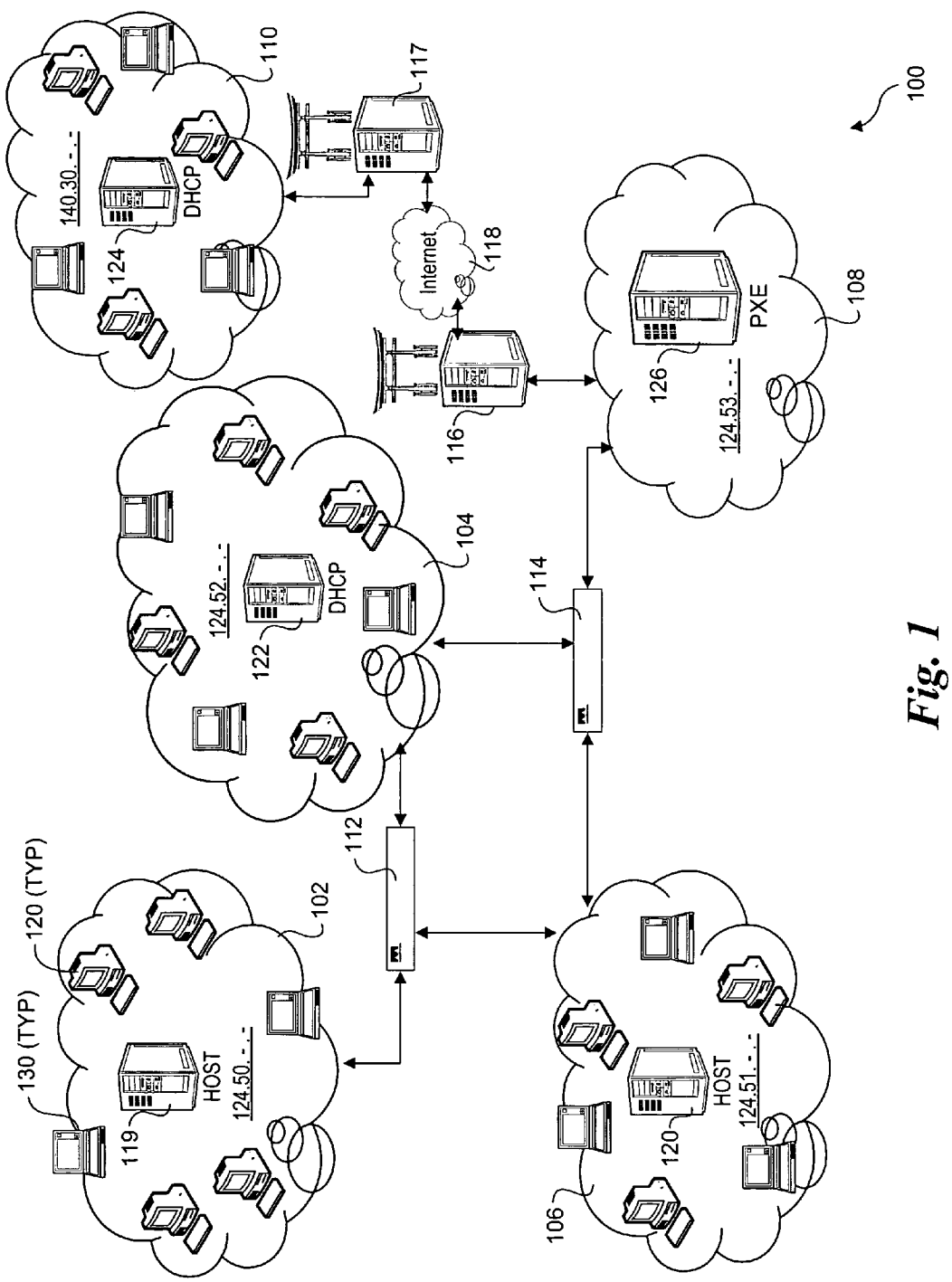
FIG. 1 is a schematic diagram of an exemplary enterprise network used to described embodiments of the invention depicted in FIGS. 1a-e.

FIG. 1 shows an exemplary enterprise network 100 including five domains 102, 104, 106, 108, and 110. Domains 102, 104 and 106 are interconnected via a switch 112, while domains 104, 106, and 108 are interconnected via a switch 114. Domain 110, which comprises a remote domain, is connected to domain 108 via a pair of gateway server 116 and 117, which are connected via the Internet 118. Optionally, the gateway servers may be lined via a leased telecommunications link or the like, or may use a virtual private network (VPN) link over Internet 118 or other public and/or private network infrastructure. Domain 102 is hosted by a domain server 119, while domain 106 is hosted by a domain server 120. Each of domains 104 and 110 are hosted by a respective Dynamic Host Control Protocol (DHCP) server 122 and 124. Domain 108 includes a Preboot Execution Environment (PXE) boot server 126. Domain 108 also includes a host server that may be the same machine used for PXE boot server 126, or may be a separate server (not shown). In some embodiments, a PXE boot server and a DHCP server or DHCP proxy server may be co-located.

Each of domains 102, 104, 106 and 110 are depicted as hosting multiple clients, including exemplary desktop clients 128 and laptop clients 130. Other types of clients may also be hosted by a given domain, including workstations and various types of servers (both not shown) in addition to the various domain and DHCP servers shown in the figures herein. Domain 108 may also host similar types of clients (not shown for clarity) to those shown in domains 102, 104, 106 and 110. It will be understood that each domain may include 10's, 100's or even 1000's of clients, only a fraction of which are depicted in the figures herein for simplicity and clarity. Some of the clients may be connected to their respective domain or DHCP server via a wired link (e.g., Ethernet), while others may be connected via a wireless link (e.g., 802.11a-g) facilitated by an appropriate wireless access point or router. For simplicity, wireless access points and routers are not depicted in the figures herein. At least a portion of the clients in each domain are configured to boot their respective operating systems using a network boot process.

Figure 2:
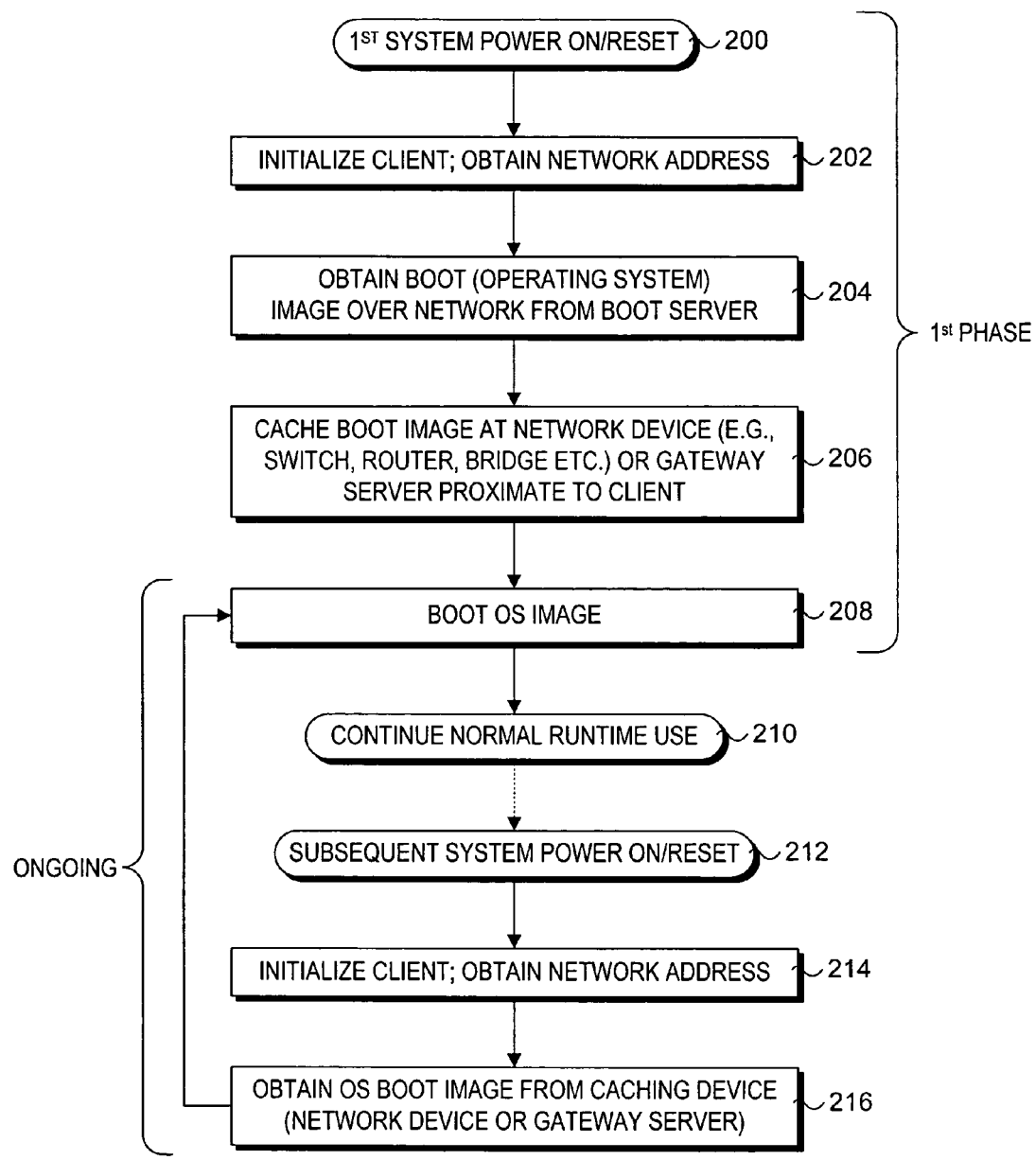
FIG. 2 is a flowchart illustrating operations performed during the first and second phases of the boot image cache and download scheme of FIGS. 1a and 1b.

FIG. 2 shows a flowchart illustrating an overview of operations that are performed to support enhanced network boot efficiency, according to one embodiment. The overall process begins with a first system power on event for a client depicted in a start block 200. In response, the client will perform a set of initialization operations via load and execution of its firmware (e.g., BIOS), including initializing the client to support network communications. In conjunction with the set of initialization operations, the client obtains a network address in a block 202.

In a block 204, the client obtains an operating system boot image over the network from a boot server. In conjunction with delivering the boot image to the client, the boot image is cached at a network device, such as a switch, router, bridge, etc., or a gateway server that is proximate to the client in a block 206. The image is then booted in a block 208 to enable run-time use, which is continued in a continuation block 210.

At continuation block 212, a subsequent system power on or reset event occurs. For example, the user has a problem and decides to reboot the client, the user decides to selectively shutdown the client for the day and the subsequent power on event represents restarting the client the following day, etc. As before, the client is initialized, enabling the client to obtain a network address in a block 214. This time, however, the client obtains the OS boot image from the caching device (e.g., switch, router, bridge, gateway server, etc.) rather than the boot server. The flowchart logic then returns to block 208 to boot the OS image, and the operations of blocks 210, 212, 214, and 216 are repeated on an ongoing basis.

Booting over a network raises several management and performance issues related to configuration, ease of use, boot latency, security issues, etc. Ideally, a uniform and consistent set of pre-boot protocol services should be employed to ensure that network-based booting is accomplished through industry standard protocols used to communicate with the boot server. In addition, to ensure interoperability, the downloaded Network Bootstrap Program (NBP) should be presented with a uniform and consistent pre-boot operating environment within the booting client, so it can accomplish its task independent of, for example, the type of network adapter implemented in the system. This capability is useful in enhancing the manageability of the client machine in several situations; for example:

Remote new system setup. If the client does not have an OS installed on its hard disk, or the client has no hard disk at all, downloading an NBP from a server can help automate the OS installation and other configuration steps.

Remote emergency boot. If the client machine fails to boot due to a hardware or software failure, downloading an executable image from a server can provide the client with a specific executable that enables remote problem notification and diagnosis.

Remote network boot. In instances where the client machine has no local storage, it can download its system software image from the server in the course of normal operation.

One industry-standard technique for performing network booting that is employed by embodiments described herein is defined by the PXE protocol (current specification entitled Preboot Execution Environment Specification 2.1, Sep. 20, 1999). PXE is defined on a foundation of industry-standard Internet protocols and services that are widely deployed in the industry, namely TCP/IP (Transmission Control Protocol/Internet Protocol), DHCP, and TFTP (Trivial File Transfer Protocol). These standardize the form of the interactions between clients and servers. To ensure that the meaning of the client-server interaction is standardized as well, certain vendor option fields in the DHCP protocol are used, which are allowed by the DHCP standard. The operations of standard DHCP and/or BOOTP servers (that serve up IP addresses and/or NBPs) are not be disrupted by the use of the extended protocol. Clients and servers that are aware of these extensions will recognize and use this information, and those that do not recognize the extensions will ignore them.

In brief, the PXE protocol operates as follows. The client initiates the protocol by broadcasting a DHCPDISCOVER message containing an extension that identifies the request as coming from a client that implements the PXE protocol. Assuming that a DHCP server or a Proxy DHCP server implementing this extended protocol is available, after several intermediate steps, the server sends the client a list of appropriate (PXE) Boot Servers. The client then discovers a Boot Server of the type selected and receives the name of an executable file on the chosen Boot Server. The client uses TFTP to download the executable from the Boot Server. Finally, the client initiates execution of the downloaded image. At this point, the client's state must meet certain requirements that provide a predictable execution environment for the image. Important aspects of this environment include the availability of certain areas of the client's main memory, and the availability of basic network I/O services.

On the server end of the client-server interaction, services are made available that are responsible for providing redirection of the client to an appropriate Boot Server. These redirection services may be deployed in two ways:

1. Combined standard DHCP and redirection services. The DHCP servers that are supplying IP addresses to clients are modified to become, or are replaced by servers that serve up IP addresses for all clients and redirect PXE-enabled clients to Boot Servers as requested.
2. Separate standard DHCP and redirection services. PXE redirection servers (Proxy DHCP servers) are added to the existing network environment. They respond only to PXE-enabled clients, and provide only redirection to Boot Servers.

To enable the interoperability of clients and downloaded bootstrap programs, the client PXE code provides a set of services for use by the BIOS or a downloaded NBP. The API (Application Program Interface) services provided by PXE for use by the BIOS or NBP are:

Preboot Services API. Contains several global control and information functions.

Trivial File Transport Protocol (TFTP) API. Enables opening and closing of TFTP connections, and reading packets from and writing packets to a TFTP connection.

User Datagram Protocol (UDP) API. Enables opening and closing UDP connections, and reading packets from and writing packets to a UDP connection.

Universal Network Driver Interface (UNDI) API. Enables basic control of and I/O (input/output) through the client's network interface device. This allows the use of universal protocol drivers such that the same universal driver can be used on any network interface that implements this API.

The PXE protocol is a combination of an extension of DHCP (through the use of several DHCP Option tags) and the definition of simple packet transactions that use the DHCP packet format and options to pass additional information between the client and server. In the PXE protocol, DHCP options fields are used to do the following:

Distinguish between DHCPDISCOVER and DHCPREQUEST packets sent by a client as part of this extended protocol from other packets that the DHCP server or Boot Server might receive;

Distinguish between DHCPOFFER and DHCPACK packets sent by a DHCP or Proxy DHCP server as part of this extended protocol from other packets that the client may receive;

Convey the client system's ID to the DHCP and Boot Server;

Convey the client system's architecture type to the DHCP and Boot Server; and

Convey the Boot Server type from which the client is requesting a response.

Based on any or all of the client network adapter type, system architecture type, and client system ID, the Boot Server returns to the client the file name (on the server) of an appropriate executable. The client downloads the specified executable into memory and executes it.

Figure 1A:
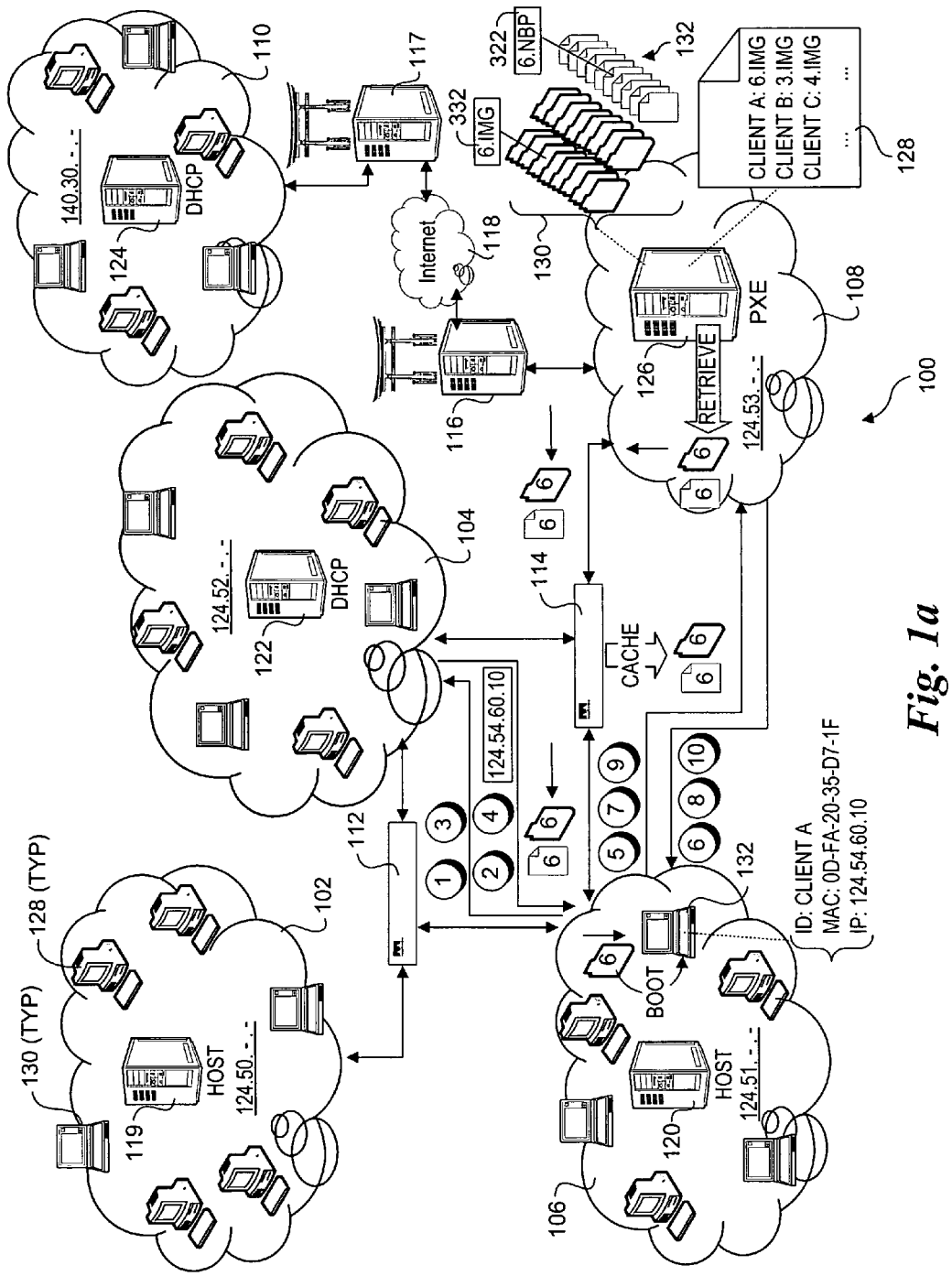
FIG. 1a schematically depicts the first phase of one embodiment of the invention, wherein a network bootstrap program file and a boot image are cached on a network device in conjunction with downloading the same from a boot server to a client.
Figure 3A:
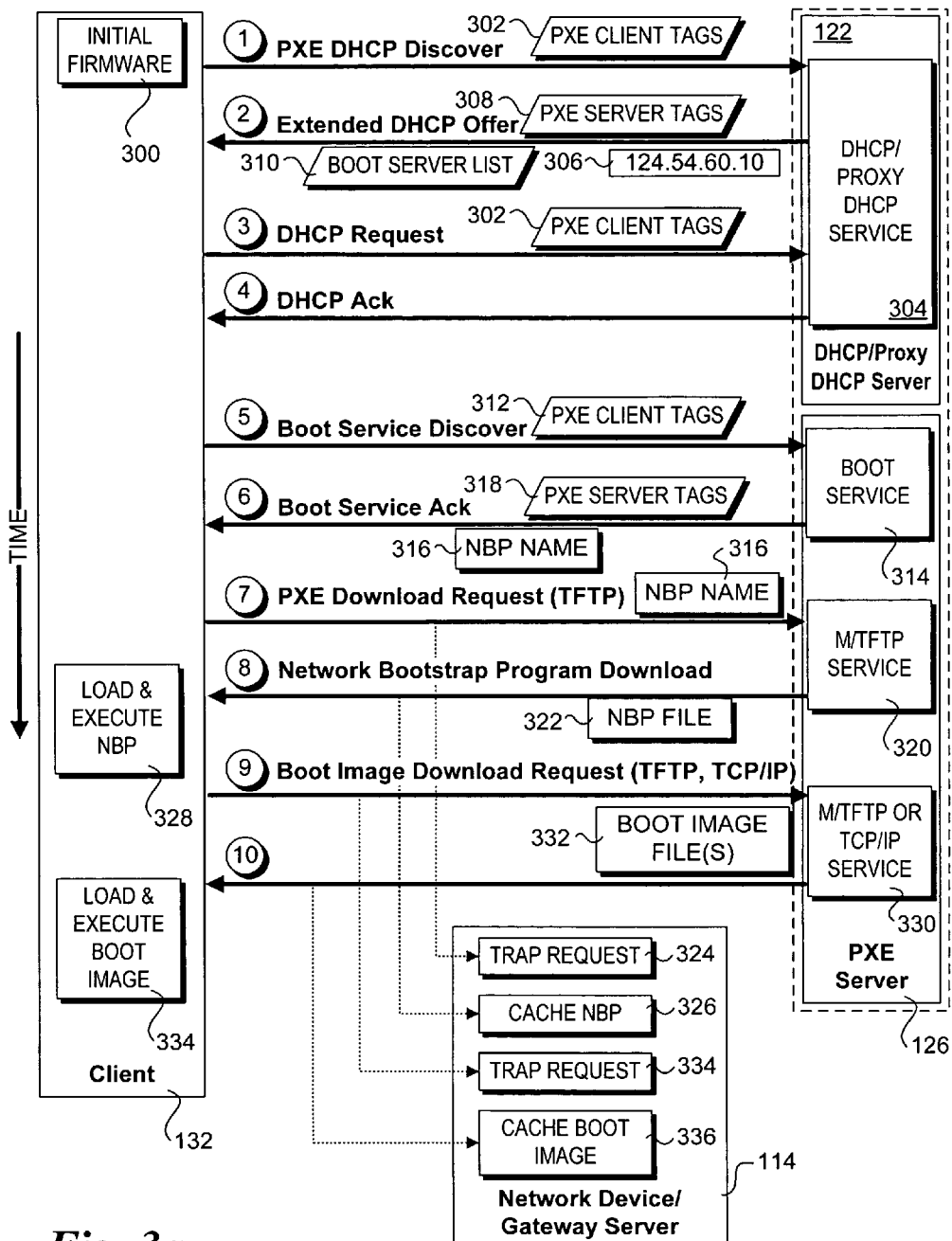
FIG. 3a is a message flow diagram illustrating a message exchange sequence corresponding to the first phase operations of FIGS. 1a and 2.

A message exchange sequence corresponding to the initial (first) phase PXE operations performed under one embodiment of the initial phase of FIG. 2 is schematically depicted in FIGS. 1a and 3a. Many of these operations pertain to a conventional PXE boot sequence, as is known in the art. However, additional operations are performed to provide caching of boot images.

As shown by an initial firmware block 300, the process begins with the client (e.g., client 132) initializing its platform via load and execution of a corresponding set of firmware. During the platform initialization, the client is configured to support PXE-level network communications, which employ packet-based messages. There is no requirement to support more complex transmission protocols, such as TCP/IP, at this point.

Following client platform initialization, a PXE boot process begins at step 1, with a client broadcasting a DHCPDISCOVER message to the standard DHCP port (67). An option field in the message contains the following information, which is collectively depicted as PXE client tags 302 in FIG. 3a: 1) a tag for a client identifier (UUID—universal unique identifier); 2) a tag for the client UNDI version; 3) a tag for the client system architecture; and 4) a DHCP option 60, Class ID, set to "PXEClient:Arch:xxxxx:UNDI:yyyzzz".

Under conventional DHCP usage, a DHCP server is used to allocate dynamic and static (i.e., reserved) DHCP addresses in response to address requests from various clients. In general, a DHCP server may operate in conjunction with a domain server, and may be co-located with a domain server. A given DHCP server may serve a single domain, or may serve multiple domains that are related. For example, in the exemplary network of FIGS. 1 and 1a-e, DHCP server 122 serves domains 102, 104, 106 and 108, while DHCP server 124 servers domain 110.

In the example shown in FIG. 1a, a client 132 broadcasts a DHCPDISCOVER request across its local domain 106. This DHCPDISCOVER message is then forwarded to the domain 104 of DHCP server 122 in accordance with the DHCP protocol, where it is "listened" for by a DHCP or DHCP proxy service 304. (A DHCP proxy server may also be used in place of DHCP server 122, thus the DHCP proxy service option.) Furthermore, the DHCPDISCOVER message may be "heard" by other DHCP servers (not shown) in the enterprise network.

At step 2, the DHCP or Proxy DHCP Service 304 responds by sending an extended DHCPOFFER message to client 132 on the standard DHCP reply port (68). If this is a Proxy DHCP Service, then the client IP address field is null (0.0.0.0). If this is a DHCP Service, then the returned client IP address field (as depicted by an IP address 302) is valid. At this point, other DHCP Services and BOOTP Services within the listening range of the client may also respond with DHCP offers or BOOTP reply messages to port 68. Each message contains standard DHCP parameters: an IP address 306 for the client and any other parameters that an administrator might have configured on the DHCP or Proxy DHCP service. The extended DCHP offer further includes PXE server extension tags 308 containing data described below.

From the DHCPOFFER(s) that the client receives, it records the following: 1) the Client IP address (and other parameters) offered by a standard DHCP or BOOTP Service; 2) the Boot Server list 310 from the Boot Server field in the PXE tags from the DHCPOFFER; 3) the Discovery Control Options (if provided); and 4) the Multicast Discovery IP address (if provided).

If the client selects an IP address offered by a DHCP Service, then it must complete the standard DHCP protocol by sending a request (DHCP Request message at step 3) for the address back to the Service and then waiting for an acknowledgment from the Service (DHCP Ack reply message at step 4). If the client selects an IP address from a BOOTP reply, it can simply use the address.

At step 5, the client 132 selects and discovers a Boot Server (e.g., PXE server 126), using a Boot Service Discover message. This message may be sent as a broadcast (port 67), multicast (port 4011), or unicast (port 4011) depending on discovery control options included in the previous DHCPOFFER containing the PXE service extension tags 308. This packet is the same as the initial DHCPDISCOVER in Step 1, except that it is coded as a DHCPREQUEST and now contains the following: 1) the IP address assigned to the client from a DHCP Service; 2) a tag for client identifier (UUID); 3) a tag for the client UNDI version; 4) A tag for the client system architecture; 5) a DHCP option 60, Class ID, set to "PXEClient:Arch:xxxxx:UNDI:yyyzzz"; and 6) The Boot Server type in a PXE option field. This information is collectively depicted as PXE client extension tags 312. The Boot Service Discover message is received by a boot service 314 running on PXE server 126.

In response to the Boot Service Discover message, boot service 314 unicasts a DHCPACK packet comprising a Boot Service Ack(nowledgement) message back to the client (132) at step 6 on the client source port. This reply packet contains: 1) a Network Bootstrap Program (NBP) name 316; 2) MTFTP (multi-cast TFTP) configuration parameters; and 3) any other options the NBP requires before it can be successfully executed, as depicted by PXE server extension tags 318.

The particular NBP file returned to the client will usually depend on the client's platform configuration and other considerations selected by the network administrator. In one embodiment, image-mapping information 128 is maintained at PXE server 126 that maps each client to a corresponding image file from a set of image files 130 stored on the PXE server. Each image file is associated with a corresponding NBP file. Optionally, separate NBP file mapping information may also be maintained (not shown), which is used to map each client to a corresponding NBP file from among the NBP files 132 stored on PXE server 126. In general, the client may be identified using one of many well-known means, such as via the client's IP address, MAC address, client host name, etc.

At step 7, client 132 sends a PXE download request for the NBP file using the TFTP protocol to an M/TFTP service 320 running on PXE server 126. In response to the request at step 8, the M/TFTP service 320 downloads an executable NBP file 322 using either standard TFTP (port 69) or MTFTP (using the port assigned in the Boot Server Ack message). The particular file that is downloaded and the placement of the downloaded code in memory is dependent on the client's platform architecture and OS configuration considerations. In the exemplary sequence depicted in FIG. 1a, the NBP file is labeled "6".

In accordance with aspect of some embodiments, the NBP file is cached at a network device or gateway server along the data path between the requesting client (e.g., client 132 in the present example) and the PXE server and proximate to the requesting client. In the example of FIG. 1a, the caching device is switch 114. In one embodiment, files that are to be cached are identified by a proceeding request message using one of the manners described below for caching files. In one embodiment, the request is "trapped" by switch 114, as depicted by a block 324 in FIG. 3a, and the corresponding NBP file is cached, as depicted by a block 326 in FIG. 3a.

In some implementations, the PXE client may wish to perform an authenticity test on the downloaded NBP file. If the test is required, the client sends another DHCPREQUEST message to the PXE boot server requesting a credential file for the previously downloaded NBP file, downloads the credentials via TFTP or MTFTP, and performs the authenticity test. For simplicity, this authenticity portion of the message exchange sequence is not shown in FIGS. 1a or 3a.

Upon receipt of NBP file 322 (and in view of passing the authenticity test, if performed), the NBP executable is loaded and executed at client 132 in a block 328. In general, an NBP file is used to prepare the client for loading a much larger OS image, which may be transferred as a single bundled file or a set of files. The NBP file contains a list of files that need to be downloaded from a boot server, and the location of the files (e.g., a network address and port for the boot server). For example, while the OS image file(s) may be typically downloaded from a PXE server, this isn't a strict requirement. The purpose of the PXE boot process is to prepare the client for booting an OS image particular to the client. The NBP file defines the particular OS image and its location on the network.

The particular file transport mechanism for downloading the OS boot image may also be facilitated by the NBP file. For example, if the boot image file(s) is/are to be downloaded via an M/TFTP service, the client is already configured to support M/TFTP transmissions, and thus no further network service needs to be loaded. However, if the image file(s) is/are located on a file server or similar storage means, it may be necessary to initialize another network transmission service on the client, such as TCP/IP. (It is noted that TCP/IP may also be used for downloading OS images from a PXE boot server.)

In view of the NBP file, the client 132 sends a boot image download request at step 9 to an appropriate server via which the image file(s) may be accessed. In the example depicted in FIGS. 1a and 3a, this server is PXE server 126. The download request is facilitated by M/TFTP or TCP/IP service 330 running on PXE server 126, and results in one or more OS boot image files 332 being returned to the client at step 10. Upon receipt of the boot image file(s), it/they are loaded and executed to boot the operating system for the client in a block 334. If the image is a single file, the NBP executable will contain an application to extract the applicable OS files and store them on the client to enable the OS to be booted.

In accordance with aspects of some embodiments, the boot image file(s) is/are cached at the network device or gateway server proximate to the client. Accordingly, in one embodiment the boot image download request message is trapped, as depicted by a block 334. In one embodiment, the boot image file(s) is/are then cached at the network device or gateway server, as depicted by a block 336. In one embodiment, the boot image file(s) is/are cached without trapping the corresponding request message. Details of various caching schemes are described below.

Figure 1B:
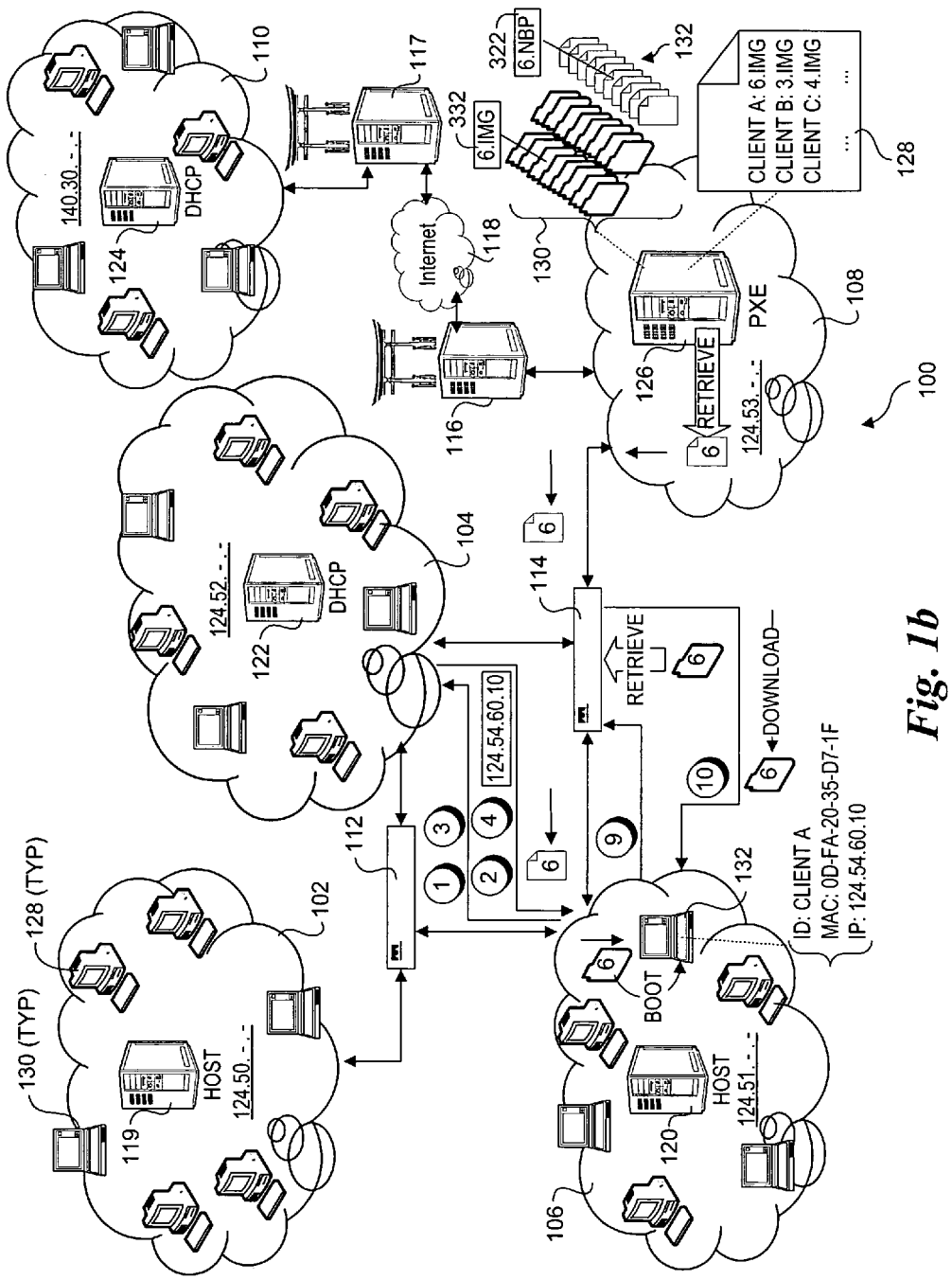
FIG. 1b schematically depicts a second phase of the download technique, wherein the cache boot image is downloaded directly from the network device.
Figure 1C:
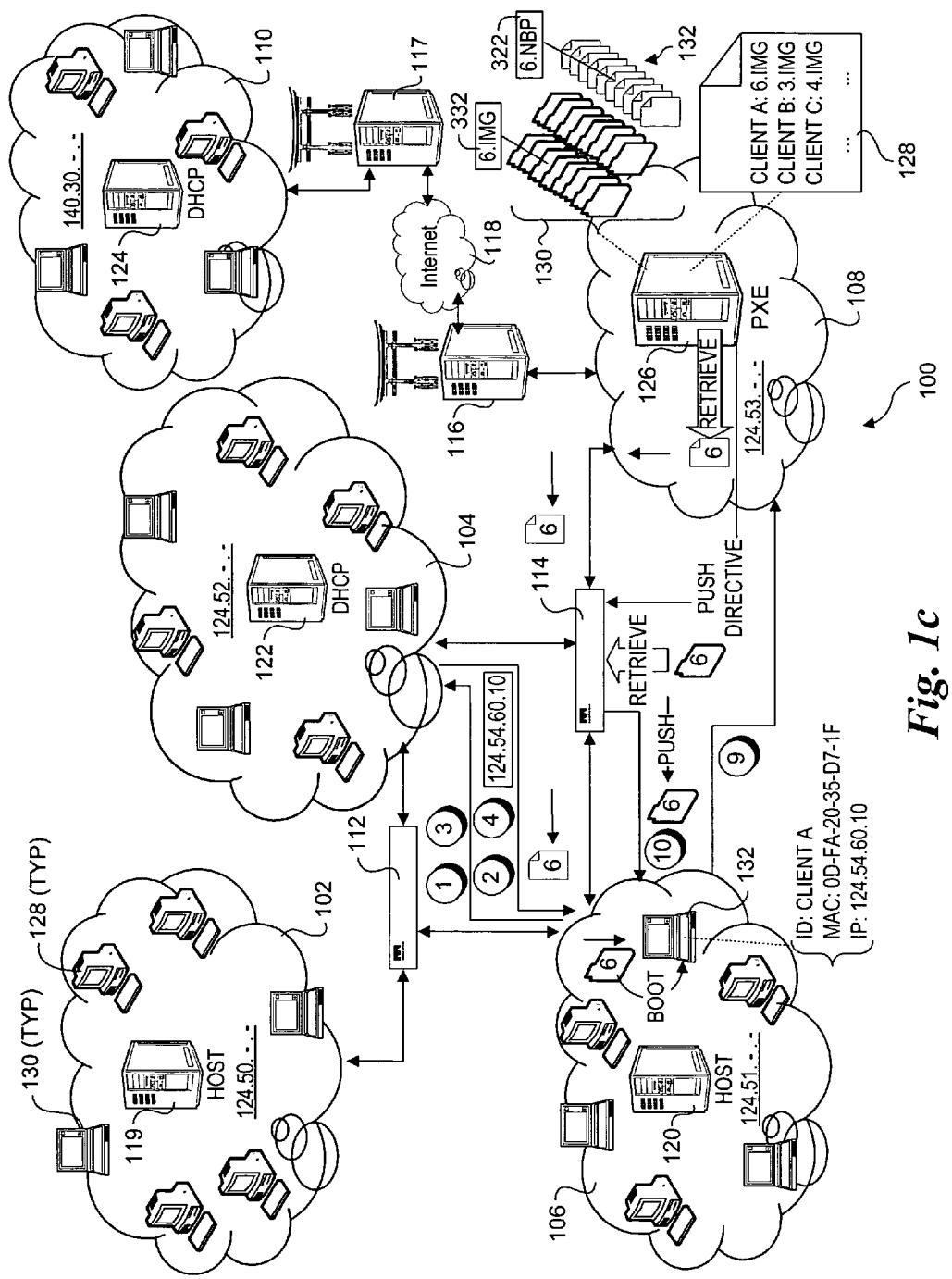
FIG. 1c schematically depicts one embodiment under which the boot server sends a download directive to the network device to push a copy of the cached boot image to the client.
Figure 3B:
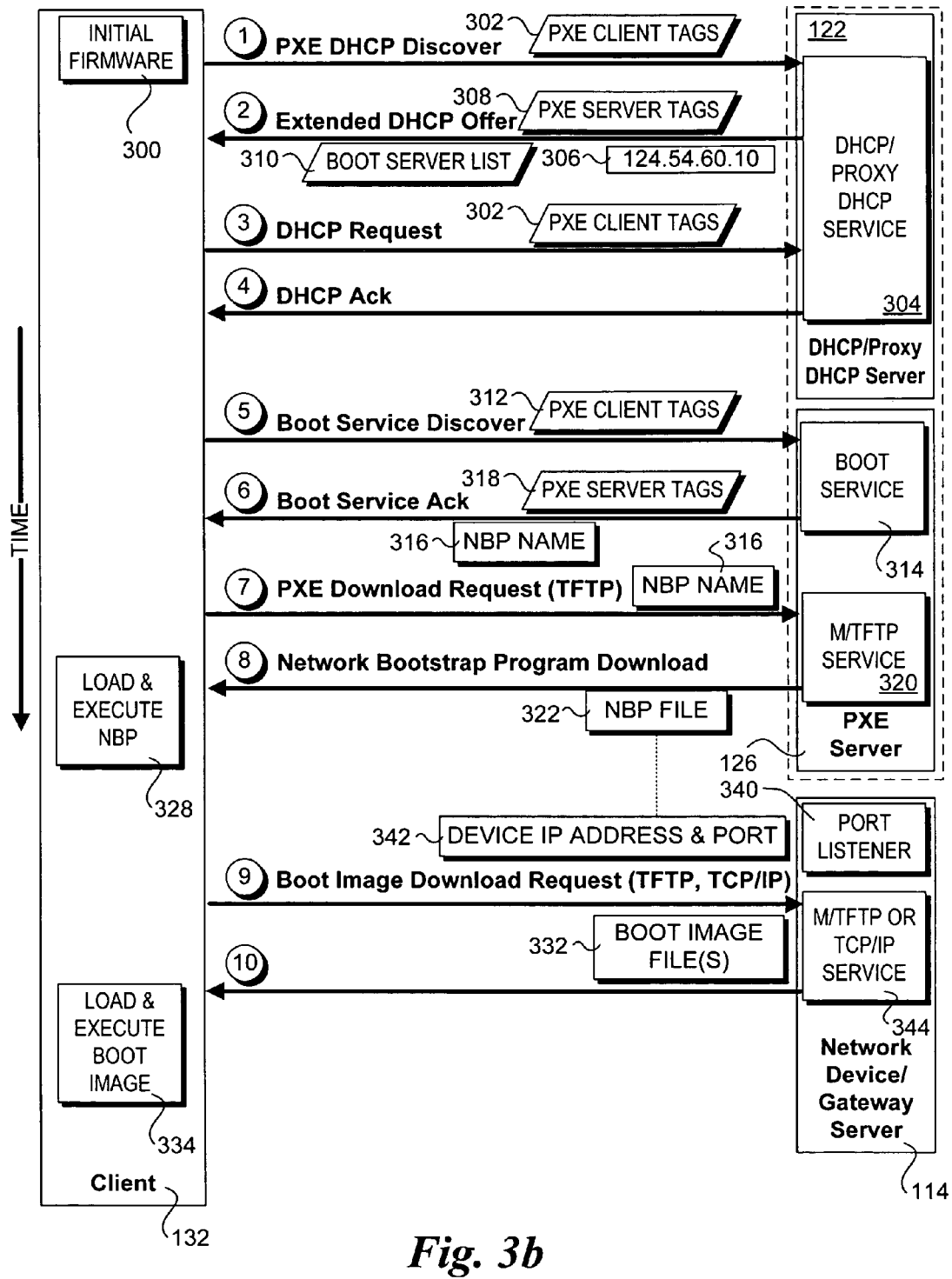
FIG. 3b is a message flow diagram illustrating a message exchange sequence corresponding to the second phase operations of FIGS. 1b and 2.

Schematic and message flow diagrams corresponding to various embodiments under which boot image file(s) are received from a caching device during the ongoing phase of FIG. 2 are shown in FIGS. 1*b*, 1*c,* 3*b* and 3*c.* The process begins in response to a system power on or reset event in continuation block 212 of FIG. 2. In response, similar operations corresponding to steps 1-8 of FIGS. 1*a* and 3*a* are performed, as shown in FIGS. 1*b-c* and 3*b-c.* (For clarity, encircled numbers corresponding to steps 5-8 are not shown in FIGS. 1*b* and 1*c.*) In one embodiment, NBP file 322 contains information that identifies the IP address for switch 114 as the storage location for boot image file(s) 322. Accordingly, rather than send a boot image download request message to PXE server 126, the message is sent directly to switch 114 at step 9 using, e.g., a management port, as shown in FIG. 3*b.*

In one embodiment, switch 114 hosts a port listener 340 that is employed to detect the receipt of messages for one or more selected ports. Corresponding port and address information 342 is provided in the NBP file, such that the boot image download request message is sent to an appropriate port. Switch 114 also runs an M/TFTP or TCP/IP service 344, which is used to send and receive TFTP and/or TCP/IP transmissions. In response to receiving the boot image download request message, one or more corresponding boot image files, as depicted by boot image 6 in FIG. 1*b,* is/are retrieved from a local storage device hosted by switch 114 and downloaded to client 132 at step 10.

Figure 3C:
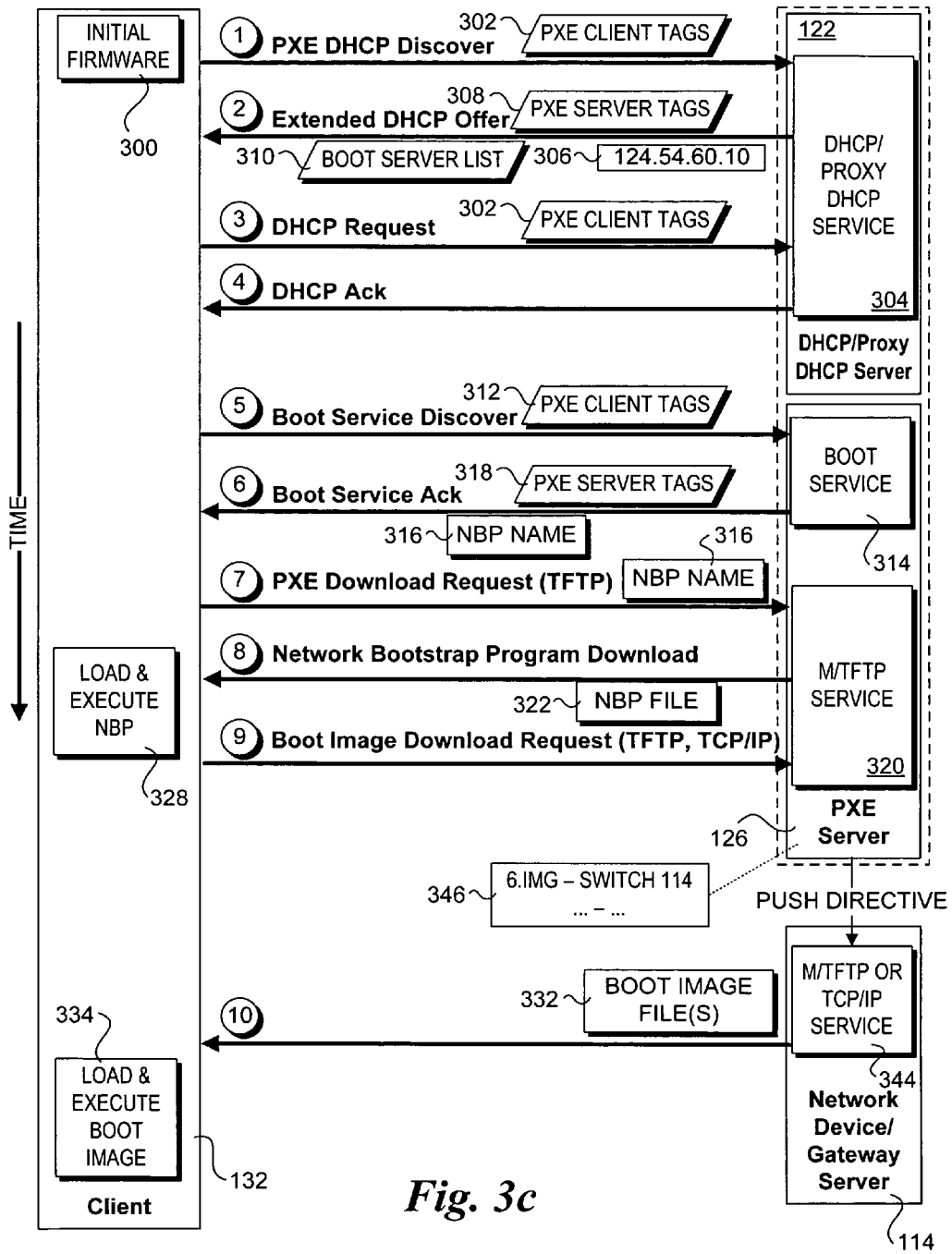
FIG. 3c is a message flow diagram illustrating a message exchange sequence corresponding to the second phase operations of FIG. 1c.

In one embodiment shown in FIGS. 1*c* and 3*c,* switch 114 is a managed switch that is controlled by PXE server 108 using an in-band or out-of-band management channel or the like. In this embodiment, switch 114 does not need to employ a listener or detect the boot image download request message. Rather, the boot image download request message is sent to PXE server 126, as before. In response to the message, PXE server 126 checks a cache device-image map 346, which is used to maintain a list of images that are cached at each network device and gateway server in the enterprise network. As described below, in one managed switch embodiment, PXE server 126 directs a given switch to cache boot images and, optionally, NBP files, so the PXE server is aware (via cache device-image map 346) of what boot images are cached at which network devices.

Once the appropriate network device at which the appropriate cached image is identified, PXE server 126 sends a push directive via the management channel to that device (e.g., switch 114 in the illustrated example), instructing the device to push a file or set of files specified by the directive to client 132. The file or set of files will corresponding to the one or more boot image files, and the directive will typically include at least one of the IP address or MAC address for the client destined to receive the file or files.

Figure 1D:
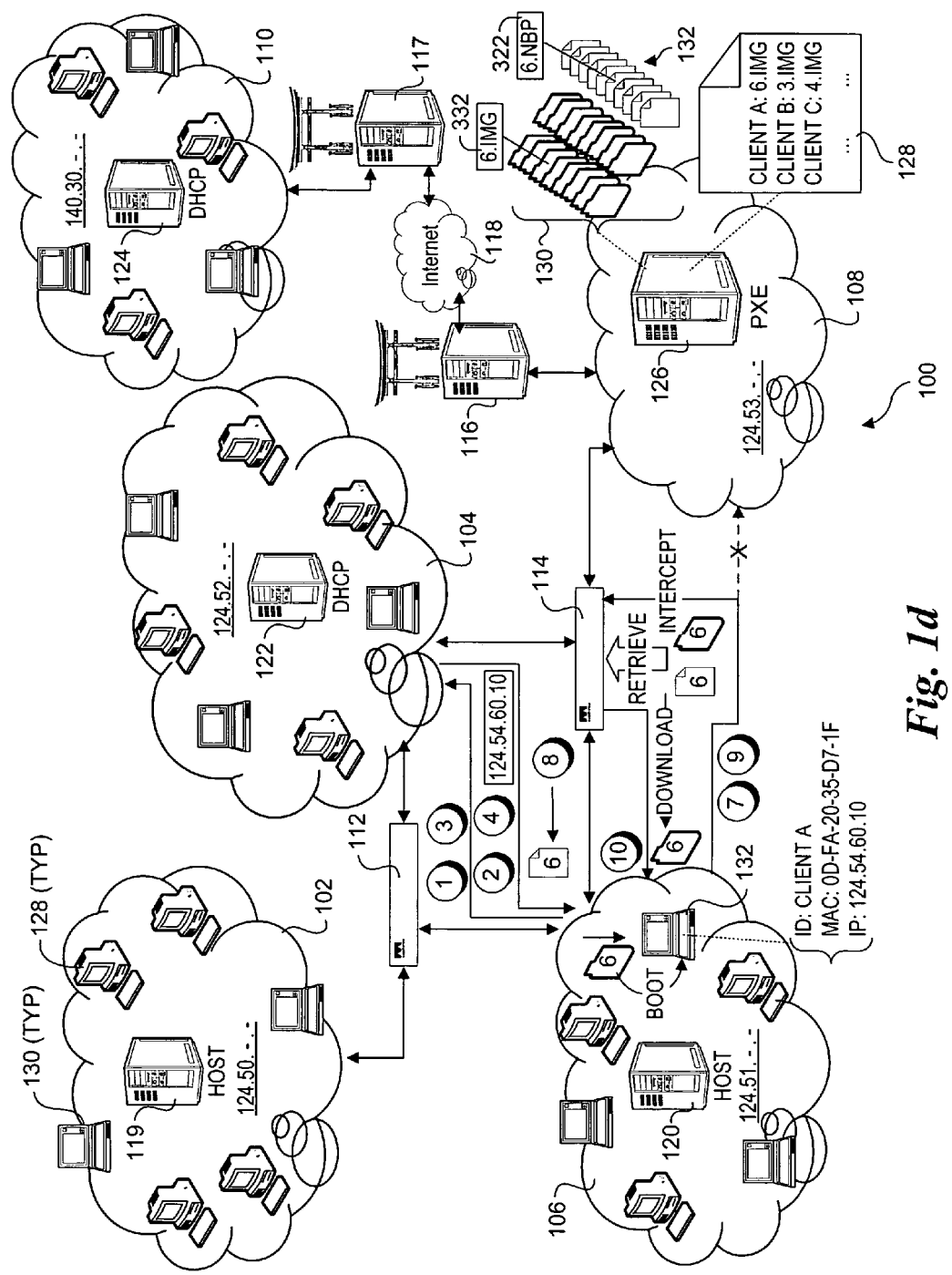
FIG. 1d schematically depicts one embodiment under which request messages intended for the boot server are intercepted and processed at the network device.
Figure 3D:
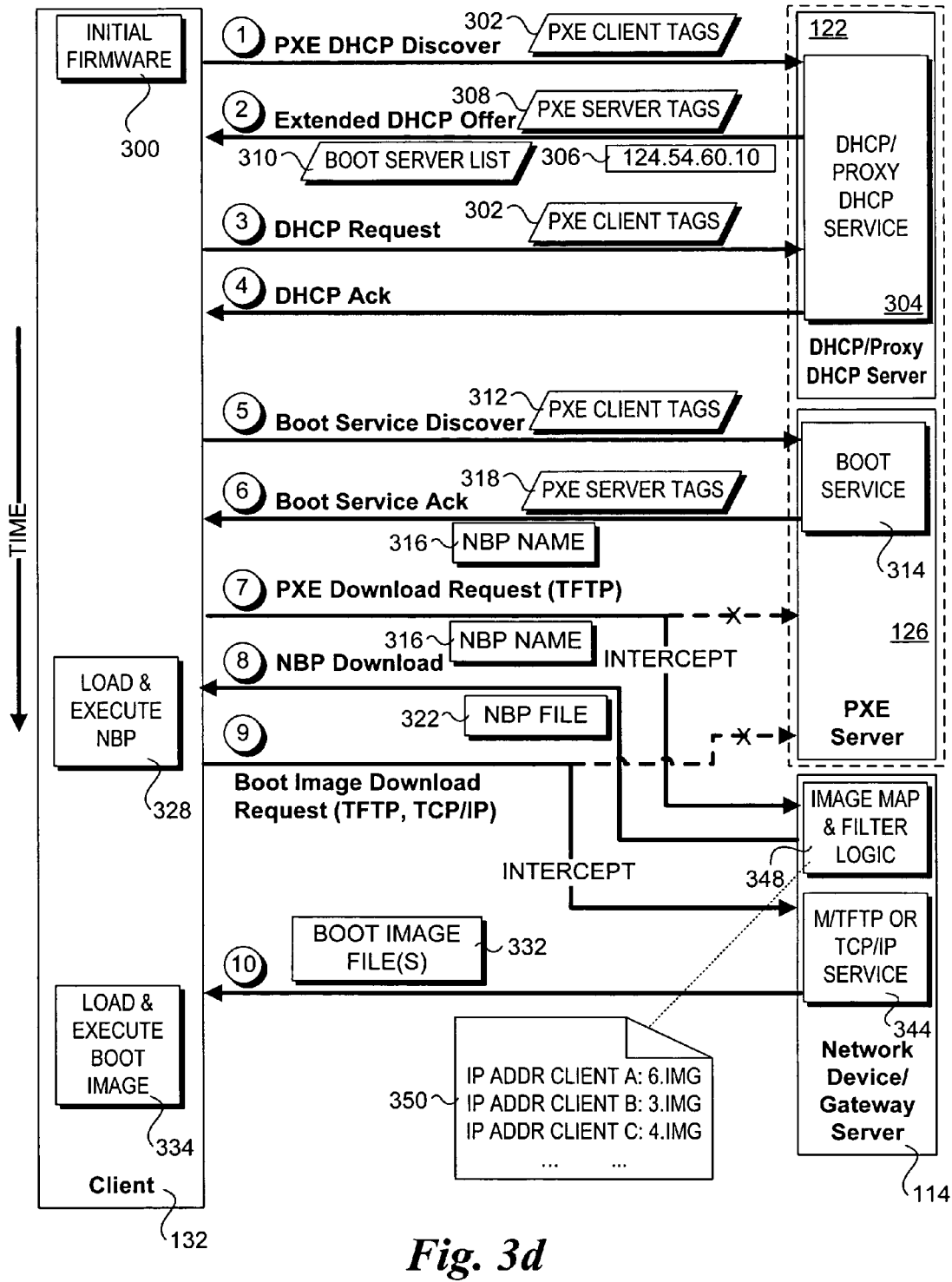
FIG. 3d is a message flow diagram illustrating a message exchange sequence corresponding to the second phase operations of FIG. 1d.

Under the embodiment of FIGS. 1*d* and 3*d,* each of the PXE download request and boot image download request messages are intercepted by an "intelligent" switch 114 that includes an image map and filter logic 348. In one embodiment illustrated by an image map 350, each intelligent network devices stores data mapping each boot image that it has cached and, optionally, a corresponding NBP file that it has cached to corresponding client identifiers, such as an IP (illustrated in FIG. 3*d*) or MAC address. In one embodiment, the filter logic stores the IP address and applicable ports of the PXE server as well.

The filter logic is used to determine which messages to intercept. In one embodiment, the filter logic looks at the source and destination addresses in the IP packet header. Optionally, the port information for the PXE server is also considered by the filter. If the source address matches one of the client IP addresses stored in image map 350 and the destination address matches the PXE server IP address (and optionally the port information matches), the intelligent network device reroutes the corresponding packets internally to "slow path" processing, which is typically used for handling errant packets. In one embodiment, an application in the slow path is used to search the packet payload data to determine if the packet corresponds to a PXE download request or boot image download request, using well-known string search operations and the like. Packets that meet the filter criteria are "intercepted" by the intelligent network device, and not forwarded on to the destination PXE server. In response to receiving an intercepted message, the applicable data content is extracted to identify the requested file and any other relevant information. The NBP file 322 (if cached) and boot image file(s) 332 are then downloaded directly to the client by the intelligent network device, bypassing the PXE server. In one embodiment, each of the PXE download request and boot image download requests are intercepted. In another embodiment, only the boot image download request is intercepted.

Figure 4:
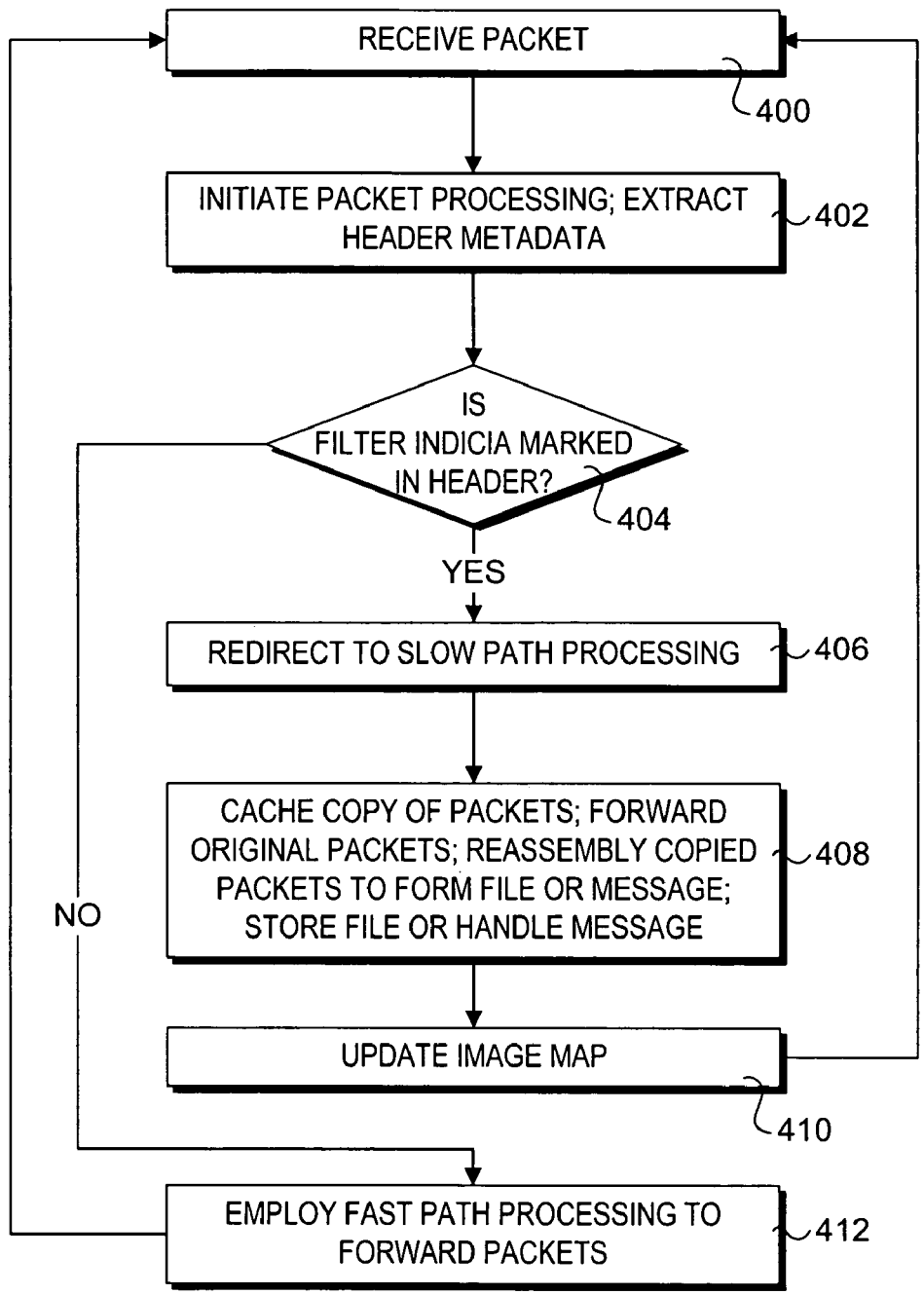
FIG. 4 is a flowchart illustrating operations and logic performed by one embodiment of a caching and message detection scheme that employs cache and message indicia in network packets.
Figure 5:
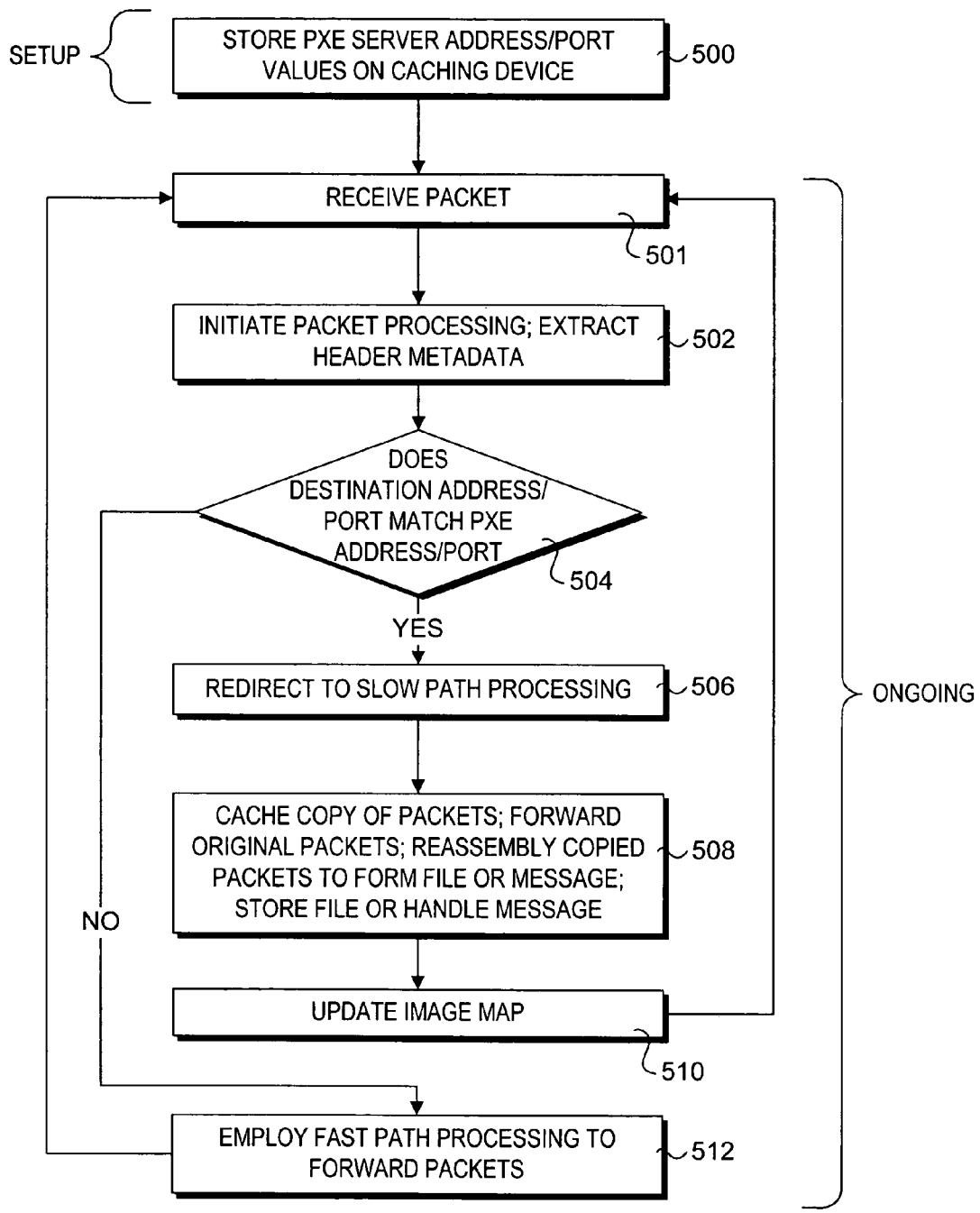
FIG. 5 is a flowchart illustrating operations and logic performed by one embodiment of a caching and message detection scheme that employs detects files and messages to be trapped and/or cached based on server address and port values in network packet headers.
Figure 6:
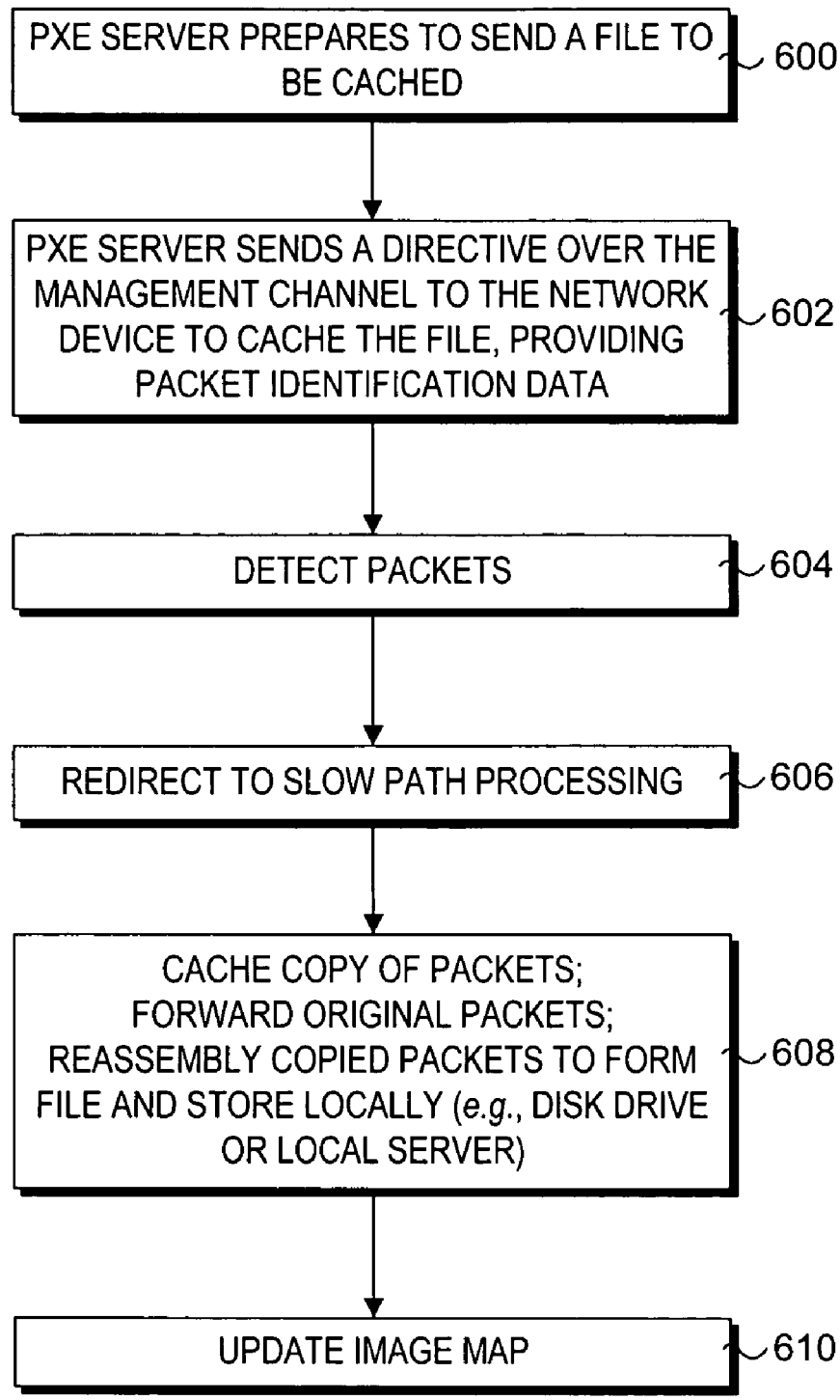
FIG. 6 is a flowchart illustrating caching operations performed in accordance with one embodiment that employs a managed network device.

Details of mechanisms for caching NBP files and image files, as well as intercepting PXE download and NBP boot images are shown in FIGS. 4-6. In the embodiment of FIG. 4, a packet header is marked with filter indicia to indicate whether the corresponding message or file is to be cached or intercepted.

In general, various techniques may be used for performing packet filtering based on corresponding packet header indicia. For example, for TFTP transmissions, a layering scheme comprising a MAC layer over IP layer over UDP layer over TFTP layer over data layer is employed. The filtering indicia could be contained in an extended header field for the IP or UDP layers, or in a reserved field for the TFTP layer. Corresponding filter logic (typically via execution of filtering software, such as described below) is employed at the network device or gateway server. The filter logic is used to search the headers for matching filter indicia. Typically, the filter indicia need only comprise 1 or a few bits, although additional bits may be used to enhance filter granularity.

Returning to FIG. 4, the filter process is initiated in response to receipt of a packet at the network device in a block 400. In a block 402, packet processing is initiated, which includes extracting applicable header data. For example, IP layer (layer 3) header data is typically employed for forwarding packets by most modern network devices. Additional header processing may be employed if the header for another layer is employed, such as UDP or TFTP. Generally, when a packet is received the header data (sometimes referred to as the packet metadata) is extracted and stored in very low latency memory (e.g., SRAM), while the packet payload data is stored in slower memory (e.g., DRAM). The reason for this is that the packet header information contains all of the information necessary for forwarding the packet, and is usually much smaller than the packet payload data. For most packets, fast path processing is performed using the packet metadata, which involves route table lookups and other well-known packet-processing operations. For problem packets (e.g., packets having destination addresses that are not available) are redirected to slow path processing. Slow path processing typically is more flexible than fast path processing, but substantially slower.

In a decision block 404, a determination is made to whether any filter indicia is marked in the header data. If filter indicia is found, the packet processing is redirected to slow path processing in a block 406. In a block 408, a copy of each packet is then cached prior to forwarding the packet, the cached packets are then reassembled, if necessary to form a file or message, and the file is stored or the message is handled. In general, a cached filed will be stored on a local non-volatile store, such as a local hard disk built into the network device chassis or otherwise communicatively-coupled to the network device. For example, the network device could actually store the cached files on a local file server that it accesses via a network link. Message handling operations are typically performed in the manner described above for handling PXE download request and boot image download request messages.

If a boot image file or NBP file is cached, a local image map stored by the network device is updated in a block 410 to reflect the addition of a new file that is now cached by the network device. The logic then returns to block 400 to process the next packet. If no filter indicia is found, fast path processing is simply continued to forward the packet, as depicted by a block 412.

FIG. 5 shows a flowchart illustrating operations and logic performed by one embodiment of an intelligent network device. The operations are similar to those described above for FIG. 4, except there are no additional fields that need to be added or modified in the packet layer headers. Instead, the intelligent network device identifies messages intended for or images sent from the PXE server based on the destination address and port value or source address and port value the message or image, respectively. Accordingly, during a setup phase the applicable PXE server address and port values are stored on each caching device (e.g., each network device and gateway server that is intended to be used for caching files), as depicted in a block 500.

The remaining operations are ongoing, beginning with the receipt of a packet in a block 501. In a block 502, packet processing is initiated, including the extraction of header metadata, wherein the operations of block 502 are performed in a manner similar to that described above for block 402. In this case, the applicable header metadata are the source and destination addresses and the source and destination ports identified in the packet headers. The source and destination addresses are contained in the IP header, while the source and destination ports are contained in the TCP header (for TCP/IP transmissions) or UDP header (for TFTP transmissions).

In a decision block 504, a determination is made to whether the source or destination address and port matches a corresponding pair of source address/port values or destination address/port values stored in block 500. If a match occurs, the packet processing is redirected to slow path processing in a block 506. In a block 508, a copy of each packet is then cached prior to forwarding the packet, the cached packets are then reassembled, if necessary to form a file or message, and the file is stored or the message is handled. In general, a cached file will be stored on a local non-volatile storage device, such as a local hard disk or local server in a manner similar to that described above for block 408.

Message handling operations are typically performed in the manner described above for handling PXE download request and boot image download request messages. Also as described above, different DHCP/PXE messages may be sent to different ports sharing the same IP address. Thus, a particular type of message may be identified by the destination port provided by the message packet TCP or UDP header. It is further noted that for implementations in which messages are intercepted, the original message packets are not forwarded to their intended destination (the PXE server).

If a boot image file or NBP file is cached, a local image map stored by the network device is updated in a block 510 to reflect the addition of a new file that is now cached by the network device. The logic then returns to block 501 to process the next packet. If the answer to decision block 504 is NO, fast path processing is simply continued to forward the packet, as depicted by a block 512.

In another embodiment, described in part above, a management channel is employed to send instructions to the network device or gateway server that are used to direct the network device or gateway server to cache files that are sent shortly after delivery of the instructions. In one embodiment, the process follows the operations shown in FIG. 6, which begins with the PXE server preparing to send a file to be cached in a block 600. During this operation, the PXE server will identify the name of the file and the IP address of the client to which the file is to be forwarded. The PXE server may also include other information in the corresponding packet headers that are generated by an appropriate transmission service (e.g., TFTP or TCP/IP) to identify which packets are to be cached. A corresponding directive and packet identification data (used for packet filtering) is then sent via the management channel to the network device in a block 602.

In general, the management channel may simply comprise a port reserved for management purposes, or a separate IP address reserved for management purposes (with the network device providing multiple IP addresses). Management data may be sent over a primary link (in-band) or a secondary link (typically out-of-band).

In a block 604, the packets are detected using appropriate filtering techniques. The packets are then redirected to slow path processing in a block 606, where operations similar to those describe above for block 408 are performed in a block 608. These operations include caching of the packets, reassembly the packets to form a file, and storing the file for local access. If applicable, the image map is updated in a block 610.

Periodically, boot images for various clients will likely be updated. During this process, the image map and optional NBF file map maintained at the PXE server will be updated to reflect the change. When an OS boot image is updated or a new OS version is mapped to a given set of clients, the previously cached image file(s) for those clients is/are now outdated, and thus invalid. Accordingly, there needs to be a mechanism to retrieve and cache the new image file(s) and remove the outdated image file(s).

Figure 7:
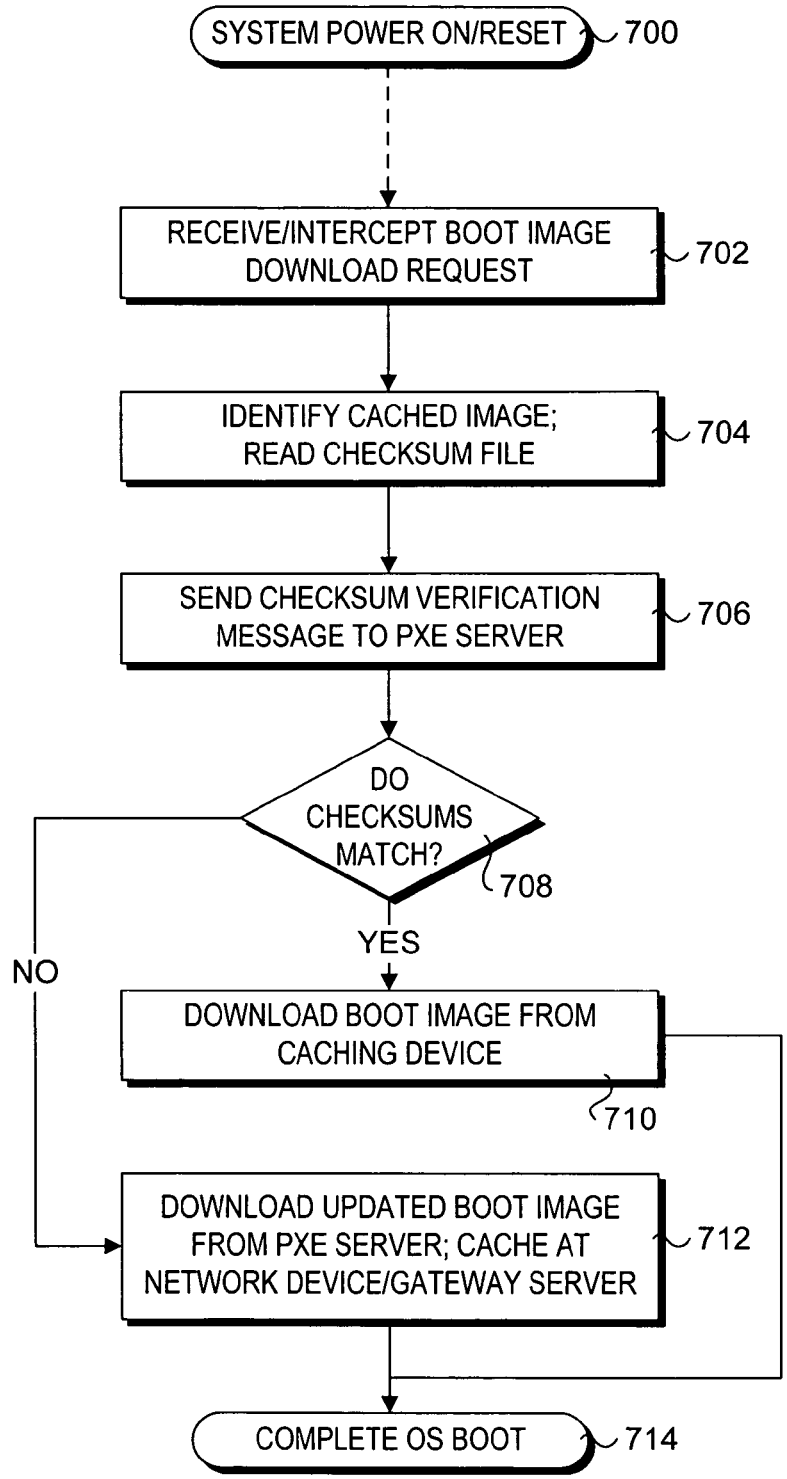
FIG. 7 is a flowchart illustrating operations and logic performed to validate a boot image in accordance with the technique depicted in FIG. 1e.

Operations and logic performed by one embodiment of a boot image update process are illustrated in the flowchart of FIG. 7. The process begins in a block 700 in response to a system power on or reset event. The operations described above for steps 1-6 are then performed, followed by receipt of a boot image download request. In a block 702, the boot image download request is intercepted at the caching device. The requested image is then identified and located in the cache, and a corresponding checksum file is read in a block 704. Optionally, a checksum may be performed on the cached image using well-known techniques.

Next, in a block 706, a checksum verification message is sent to the PXE server. The checksum verification is used to determine if the boot image that is cached is the correct version (e.g., not outdated). (For the purpose of illustration, it will be presumed in this example that the PXE download request was likewise intercepted, and a corresponding NBP file was returned to the requesting client. Thus, the NBP file may also be outdated.) In response to receiving the checksum verification message, a determination is made in a decision block 708 to whether the checksum of the boot image matches the checksum of the valid image stored on the PXE server. If the checksums match, the cached image is the same as the valid image, and thus it can be downloaded from the caching device directly to the client, as depicted in a block 710. If the checksums don't match, the cached image is invalid. Accordingly, the valid boot image is downloaded from the PXE server to the client and cached at the caching device, as depicted in a block 712. The boot image is then loaded and executed to boot the operating system in a continuation block 714.

Figure 1E:
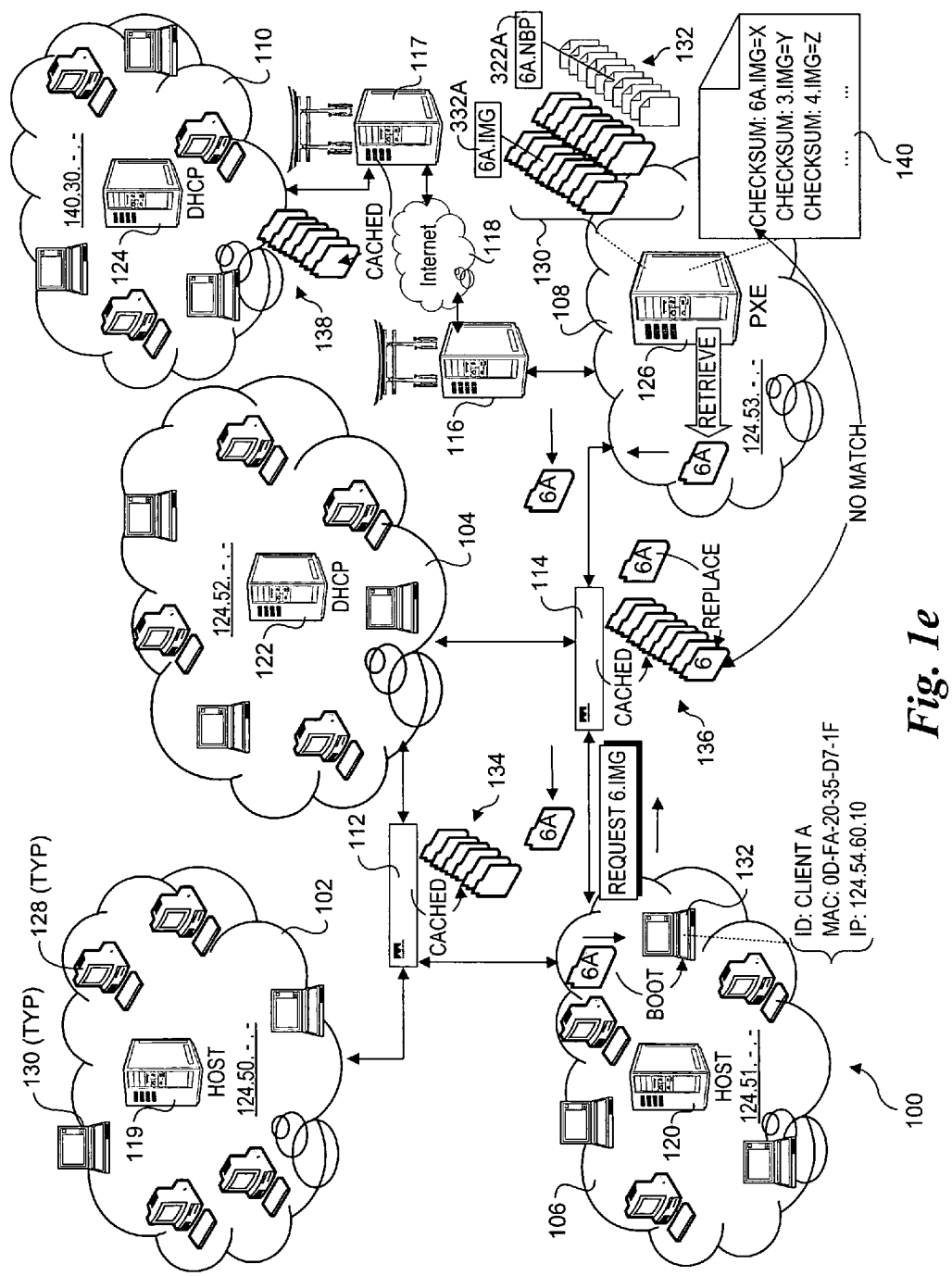
FIG. 1e schematically depicts one embodiment of a boot image configuration control scheme, wherein a checksum validation test is performed on a cached boot image to determine whether the cache boot image is a valid boot image.

An exemplary boot image update scenario performed using the flowchart of FIG. 7 is schematically depicted in FIG. 1e. Prior to the process, various boot images are cached on switches 112, and 114 and gateway server 117, as depicted by sets of cached boot images 134, 136, and 138, respectively. During the pre-boot sequence, client 132 issues a boot image download request referencing boot image 6 (file 6.IMG), which corresponds to a boot image 6 cached on switch 114. In block 702 the request is intercepted, and boot image 6 is identified in switch 114's cache (e.g., on a local disk drive). A corresponding checksum file (which also would be cached) is read, or a checksum is performed over boot image 6.

Meanwhile, PXE server 126 maintains an image checksum table 140 that maps each boot image to a corresponding checksum value. In the example illustrated in FIG. 1e, boot image 6 has been updated, such that the version of boot image 6 cached on switch 114 is now invalid. For the purpose of illustration, the updated boot image is depicted as boot image 6A (6A.IMG). If this was the actual case (i.e., the name of the boot image was changed), there would be no problem identifying outdated images. However, an updated image may share the same name with the outdated image. Thus, there is a need to distinguish the two via the checksum.

Continuing with this example, in block 706 switch 114 sends a checksum verification message to PXE server 126 referencing the boot image and the checksum value. In decision block 708, PXE server 126 determines that the checksum value for the current boot image 6A does not match boot image 6 by performing a lookup in its image checksum table 140. As a result, the valid updated boot image 6A is retrieved and returned to client 132. In conjunction with this operation, boot image 6A is cached, replacing outdated boot image 6.

It is noted that a similar process may be employed for embodiments that cache NBP files. In this instance, the PXE download request message would be intercepted, and a checksum of the NBP file referenced in the message would be checked against an NBP file checksum table stored by the PXE server.

In another embodiment, cached boot image configuration (e.g., version) control is performed by the PXE server during ongoing operations. In one embodiment of this technique depicted by the flowchart of FIG. 8, a boot image verification table is maintained on each caching device and the PXE server, as depicted by a block 800. Typically, the boot image verification table for the PXE server will include entries for all boot images, while the boot image verification tables for a given caching device will only include entries for boot images that are currently cached. In one embodiment, a single boot image verification table is maintained by the PXE server and replicated across the enterprise network such that each caching device stores a replicated version of the same table. Updates to the PXE server table are likewise replicated to the caching devices.

Figure 8:
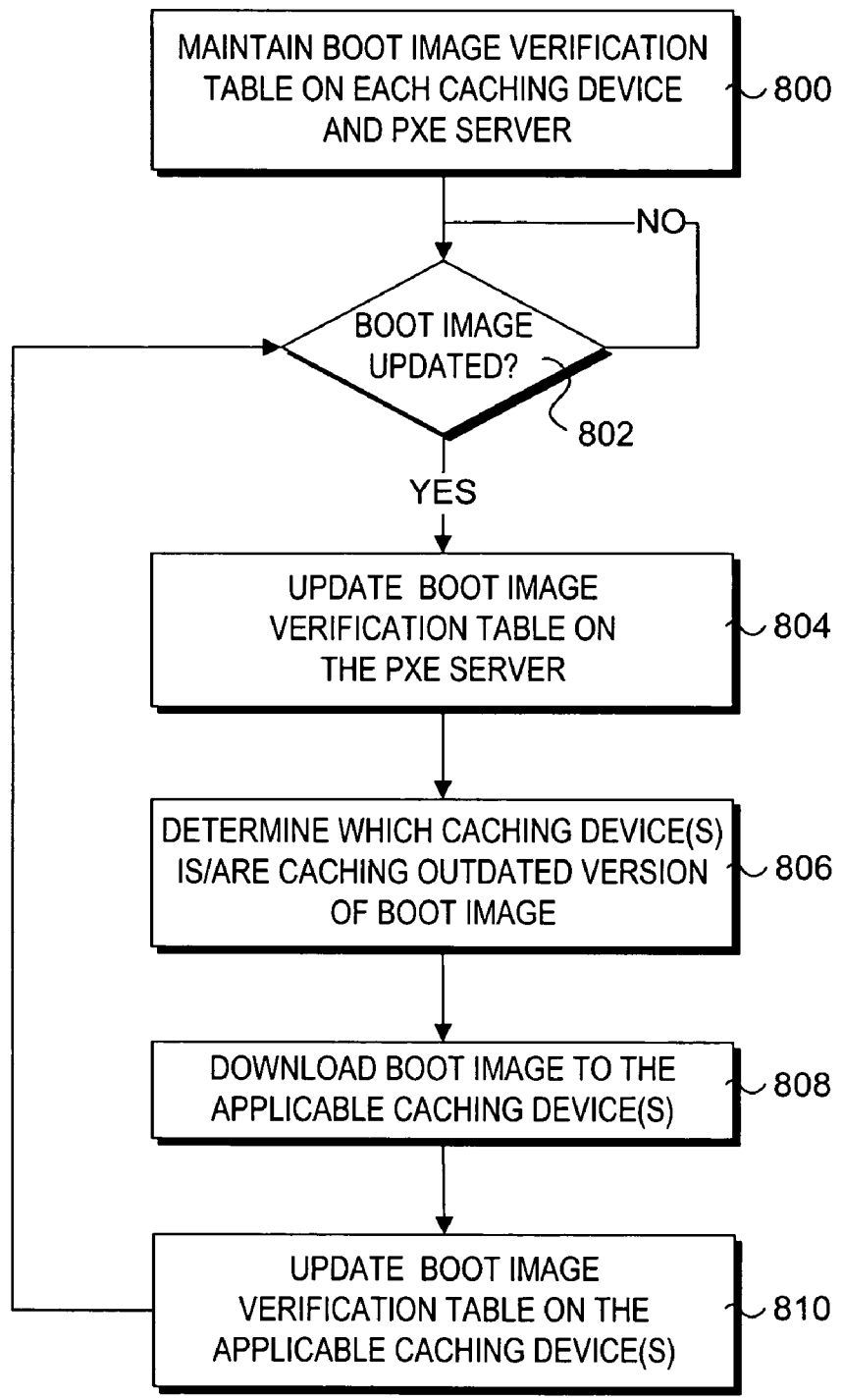
FIG. 8 is a flowchart illustrating operations and logic performed during one embodiment of a boot image configuration control scheme under which boot image verification tables are employed.

As depicted by a decision block 802 and corresponding process flow depicted in FIG. 8, the operations of blocks 804, 806, 808, and 810 are performed in response to each boot image update. In block 804, the boot image verification table on the PXE server is updated. In one embodiment, verification is made by using checksum values, so the operation of block 804 updates the checksum for the updated image.

In block 806, a determination is made to identify which caching devices are presently caching an outdated version of the boot image. In one embodiment, the PXE server broadcasts an image update message containing the image file name and the updated checksum value. In response to receipt of this message, a caching device checks is boot image verification table to determine whether it is caching an outdated image. In one embodiment of managed caching devices, the PXE server maintains information identifying which boot images are cached on which caching devices.

In block 808, the updated boot image is downloaded to each of the caching devices that are determined to be caching an outdated version of the boot image. The downloaded updated image is then cached locally, replacing the outdated version. The boot image verification table for the applicable caching device(s) is then updated in a block 810 to reflect the new image checksum value.

Figure 9:
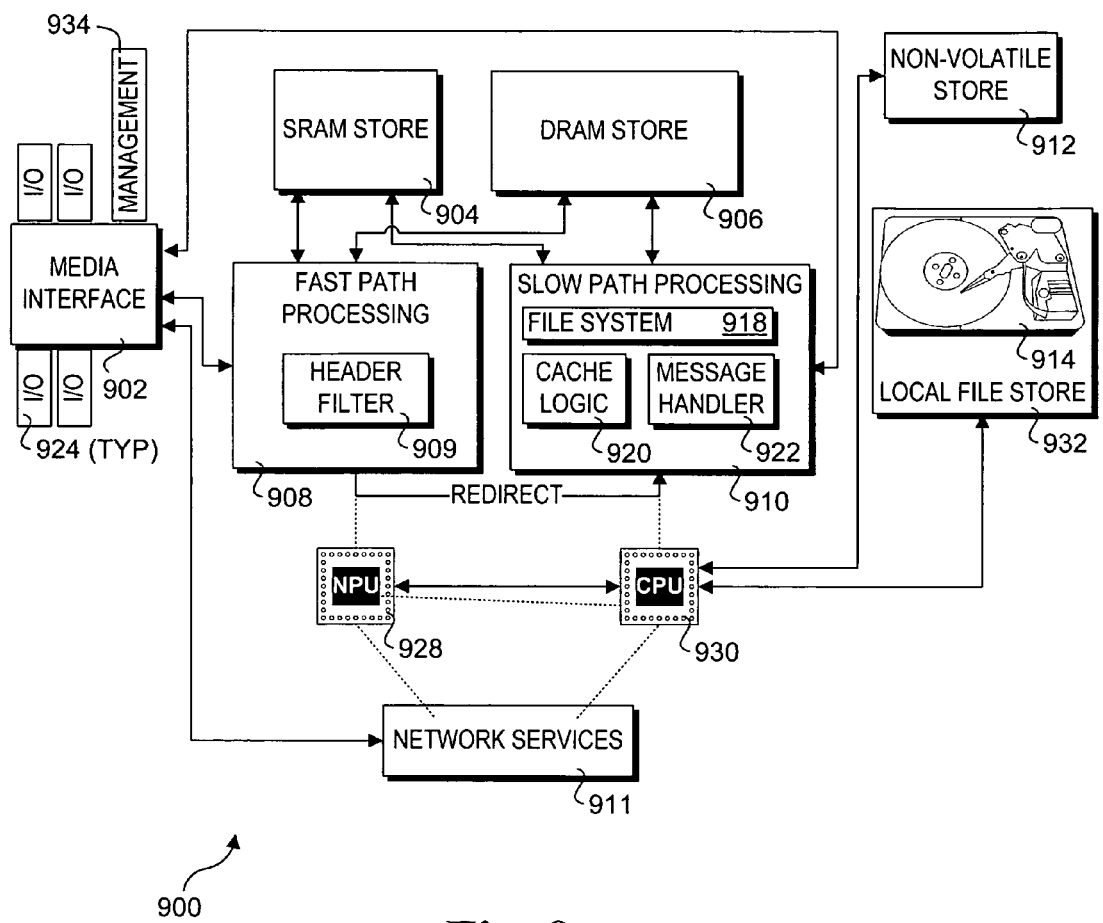
FIG. 9 is a schematic diagram of a network device architecture that may be employed to practice aspects of the embodiments described herein.

Architecture blocks corresponding to an exemplary network device 900 that supports the network device caching operations described above are shown in FIG. 9. The architecture blocks include a media interface 902, an SRAM store 904, a DRAM store 906, a fast path processing block 908, a slow path processing block 910, network services 911, a non-volatile (NV) store 912, and a local file store 914. The fast path processing block includes a packet header filter 916, while the slow path processing block includes a file system 918, cache management logic 920, and message handler 922.

Incoming network packets are received at an I/O port 924 of media interface 902, and initially processed by fast path processing block 908, which extracts packet header data and store it in SRAM store 904, while the packet payload data (or a copy of the entire packet) is cached in DRAM store 906. Under applicable embodiments described above, packet header filter 916 is used to identify packets destined to or sent from the PXE server, or otherwise containing cache or message indicia. Processing of packets that are "trapped" by packet header filter 916 is redirected to slow path processing block 922 and processed in the manner discussed above. Processing of packets that pass through packet header filter 916 is completed by fast path processing block 908, and the packet is forwarded along an appropriate route connected to an I/O port 924 of media interface 902. Similarly, upon completion of packet processing by slow path processing block 910, packets that are to be forwarded (e.g., corresponding to messages that are merely filtered but not intercepted) are provided to an appropriate I/O port 924 of media interface 902.

In some embodiments, fast path processing block 908 will be facilitated by a network processor unit (NPU) 928, such as, for example, an Intel® IXP2xxx NPU. Meanwhile, a general-purpose processor, depicted as CPU (central processing unit) 930 will be used for slow path processing block 910. In other embodiments, slow path processing may be performed by selected threads executing on an NPU. In other embodiments, both slow and fast path operations are performed using one or more general-purpose processors.

Typically, NPU's execute embedded applications via multi-threaded compute engines. Accordingly, the operations performed by packet header filter 916 may be implemented via execution of one or more threads comprising one or more sets of instructions. Generally, such instructions may be stored in NV store 912 and downloaded to the control store for (an) appropriate compute engine(s) during initialization of the NPU. Optionally, the instructions may be downloaded from local file store 914, which may comprise a local disk drive 932 or a local file server (not shown).

The multi-thread computer engine architecture of an NPU facilitates very fast packet processing. However, it is not geared to more general-purpose operations, such as running applications hosted by an operating system or lightweight OS. This type of processing is commonly handed by a general-purpose processor. In some NPU's, such as the aforementioned Intel® IXP2xxx NPU, the NPU includes a built-in general-purpose processor that may be used to facilitate the slow path processing operations described herein.

Network services 911 are used to support messaging between network device 900 and other network entities, including clients and PXE servers. For example, the network services may be employed to support various transmission protocols, including but not limited to TFTP, TCP/IP, and UDP. In general, network services 911 may be facilitated by executing corresponding software/firmware instructions on NPU 928, CPU 930, or the combination of the two.

File system 918 is used to access (e.g., store and retrieve) files stored on local file store 932. Cache logic 920 is used to determine which image files are to be cached. Message handler 922 is used for processing filtered and intercepted messages. The message handler is also used for generating messages that are sent to applicable PXE servers.

As with NPU 928, the operations depicted in slow path processing block 910 may be performed via execution of instructions (e.g., software or firmware modules or programs) on CPU 930 (if separate from NPU 928), wherein the instructions may be stored in NV store 912, or local file store 932. Thus, embodiments of this invention may be used as or to support software and/or firmware instructions executed upon some form of processing core (such as the CPU of a computer or NPU/CPU of a network device) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In some embodiments, a network device will include a management port 934 which is used receive and transmit network device management messages using an out-of-band management channel. In other embodiments, in-band management messages (messages that are received at an I/O port 924) referencing a reserved management port may be employed for network device management purpose.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
storing a plurality of boot images on a boot server;
receiving a first boot image download request from a client at the boot server;
downloading one of the plurality of boot images from the boot server to the client;
caching the boot image at a network device along a communication path linking the client to the boot server, wherein the network device is one of a plurality of network devices linking the client to the boot server;
maintaining a list of which boot images are cached at each of the plurality of network devices;
receiving a second boot image download request at the boot server; and
sending a directive from the boot server to the network device to download the boot image that is cached on the network device to the client;
embedding caching indicia in packets corresponding to the boot image that are sent from the boot server to the client via the network device to download the boot image;
employing a packet filter at the network device, the packet filter enabled to identify packets containing the caching indicia; and in response to identifying such packets;
caching the packets;
reassembling the packets to form the boot image; and
storing the boot image on a local file store accessible to the network device.

2. The method of claim 1, wherein the network device comprises one of a switch, router, or bridge.

3. The method of claim 1, wherein the network device comprises a gateway server.

4. The method of claim 1, wherein, in response to the second boot image download request sent by the client, the method further comprises downloading the boot image that is cached on the network device to the client.

5. The method of claim 4, wherein the boot server comprises a Preboot Execution Environment (PXE) boot server, the method further comprising performing a PXE message exchange sequence between the client and the PXE boot server to obtain boot images corresponding to each of the first and second boot image request.

6. The method of claim 5, further comprising:
intercepting the second boot image download request at the network device, the second boot image download request having a destination address corresponding to the PXE boot server.

7. The method of claim 6, further comprising:
embedding message filter indicia in one or more packets corresponding to the second boot image download request;
employing a message filter at the network device to determine if any packets it processes include the message filter indicia; and, in response to packets so determined,
reassembling the packets to form filtered messages, one of the filtered messages comprising the second boot image download request.

8. The method of claim 5, further comprising:
receiving a first PXE download request from the client at the PXE boot server;
downloading a network boot program (NBP) file from the PXE boot server to the client;
caching the NBP file on the network device; and in response to a second PXE download request sent by the client,
downloading the NBP file that is cached on the network device to the client.

9. The method of claim 8, further comprising:
intercepting the second PXE download request at the network device, the second PXE download request having a destination address corresponding to the PXE boot server.

10. The method of claim 1, wherein the caching indicia comprises one of a reserved field or an extended header field for a packet layer used to transmit the packet.

11. The method of claim 1, wherein the caching indicia comprises one of a source address for the boot server or the combination of the source address and a source port for the boot server.

12. The method of claim 1, further comprising:
receiving the second boot image download request sent by the client at at least one of the network device and boot server;
determining if a boot image corresponding to the second boot image download request that is cached by the network device is a valid boot image; and in response thereto,
downloading the boot image that is cached at the network device from the network device to the client if the cached boot image is determined to be valid; otherwise,
downloading a valid boot image from the boot server to the client via the network device and caching the valid boot image at the network device, the valid boot image to replace the previously cached boot image that is determined to be invalid.

13. The method of claim 12, wherein the operation of determining if the boot image cached by the network device is a valid boot image comprising:
obtaining a first checksum for the cached boot image;
obtaining a second checksum for the valid boot image stored on the boot server; and
comparing the first and second checksums, wherein matching checksums indicate the cached boot image is valid, and non-matching checksums indicate the cached boot image is invalid.

14. The method of claim 1, wherein sending the directive from the boot server to the network device to download the boot image that is cached on the network device to the client, comprises sending a push directive from the boot server to the network device via an out-of-band management channel.

15. A machine-readable medium, storing instructions that if executed on a network device perform operations comprising:
processing packets corresponding to a network boot image that are sent from a boot server to be forwarded to a client via the network device;
caching the packets corresponding to a network boot image;
reassembling the packets corresponding to a network boot image that are copied to form a boot image file;
caching the boot image by storing the boot image file on a local file store;
processing packets corresponding to a Network Bootstrap Program (NBP) that are sent from the boot server;
caching the packets corresponding to the NBP;
reassembling the packets corresponding to the NBP that are copied to form an NBP file;
caching the NBP by storing the NBP file in the local file store;
intercepting a PXE download request intended for the boot server in an IP packet including an IP packet header having a destination address corresponding to the boot server;
forwarding the NBP file to the client;
intercepting a boot image download request intended for the boot server the boot image download request in an IP packet including an IP packet header having a destination address corresponding to the boot sewer; and
forwarding the boot image file to the client.

16. The machine-readable medium of claim 15, wherein execution of the instructions perform further operations comprising:
performing a filter operation on packets received at the network device, the filter operation used to detect packets having embedded cache indicia; and in response to detection of such packets;
caching the packets;
reassembling the packets that are copied to form a file; and
caching the file on the local file store.

17. The machine-readable medium of claim 15, wherein execution of the instructions perform further operations comprising:
detecting a boot image download request sent from a client requesting a download of a boot image, the boot image download request sent to one of the boot server or the network device;
identifying the boot image that is requested;
determining if a corresponding boot image is cached on the network device; and if so,
retrieving the boot image from the local file store; and
downloading the boot image to the client.

18. The machine-readable medium of claim 15, wherein execution of the instructions perform further operations comprising:
obtaining validation check data corresponding to a boot image cached on the network device, the boot image identified by a boot image download request sent from a client;
sending the validation check data to the boot server;
receiving an indication from the boot server that the boot imaged that is cached is valid; and, in response thereto,
downloading the boot image that is cached to the client.

19. A network device, comprising:
a media interface, including at least one input/output port via which packets are received and transmitted;
at least one memory store;
at least one processor, communicatively-coupled to said at least one memory store and the media interface; and
a storage device on which instructions are stored, which if executed by said at least one processor perform operations comprising:
performing initial packet processing operations on packets received at the media interface, the initial packet processing operations including extracting packet header data;
filtering the packet header data to identify filtered packets containing indicia indicating further processing is to be performed on the packets,
examining at least one of the packet header data or packet payload data for the filtered packets to determine if the packet corresponds to a Network Bootstrap Program (NBP) sent from a boot server to be forwarded to a client via the network device;
reassembling the NBP to form a NBP file;
caching the NBP by storing the NBP file on a local file store;
intercepting a PXE download request intended for the boot server, the PXE download request in an IP packet including an IP packet header having a destination address corresponding to the boot server;
forwarding the NBP tile to the client;

examining at least one of the packet header data or packet payload data for the filtered packets to determine if the packet corresponds to a boot image sent from a boot server to be forwarded to a client via the network device;

reassembling the boot image to form a boot image file;

caching the boot image by storing the boot image file on a local file store;

intercepting a boot image download request intended for the boot server the boot image download request in an IP packet including an IP packet header having a destination address corresponding to the boot server; and forwarding the boot image file to the client.

20. The network device of claim 19, wherein said at least one processor includes at least one network processor unit (NPU).

21. The network device of claim 19, wherein said at least one processor includes at least one general-purpose processor.

22. The network device of claim 19, wherein the local file store comprises a disk drive communicatively-coupled to at least one of said at least one processor.

23. The network device of claim 19, wherein execution of the instructions performs further operations comprising:

detecting a boot image download request sent from a client requesting a download of a boot image, the boot image download request sent to one of the boot server or the network device;

identifying the boot image that is requested;

determining if a corresponding boot image is cached on the network device; and if so, retrieving the boot image from the local file store; and downloading the boot image to the client.

* * * * *